US008124230B2

(12) United States Patent
Zimmerman et al.

(10) Patent No.: US 8,124,230 B2
(45) Date of Patent: Feb. 28, 2012

(54) NON-AGGREGATING NANOPARTICLES AND THE USE THEREOF

(75) Inventors: Paul A. Zimmerman, Cedar Creek, TX (US); Aristeidis Bakandritsos, Rio Patras (GR); Michael F. Zettel, Ithaca, NY (US); Markos Trikeriotis, Ithaca, NY (US); Robert Rodriguez, Ithaca, NY (US); Emmanuel P. Giannelis, Ithaca, NY (US); Woo Jin Bae, Ithaca, NY (US); Christopher K. Ober, Ithaca, NY (US)

(73) Assignees: Intel Corporation, Austin, TX (US); Cornell University, Ithaca, NY (US)

( * ) Notice: Subject to any disclaimer, the term of this patent is extended or adjusted under 35 U.S.C. 154(b) by 0 days.

(21) Appl. No.: 12/583,078

(22) Filed: Aug. 13, 2009

(65) Prior Publication Data

US 2011/0039105 A1    Feb. 17, 2011

(51) Int. Cl.
     *B32B 5/66*      (2006.01)
(52) U.S. Cl. ........ 428/403; 428/404; 428/405; 428/406; 428/407
(58) Field of Classification Search ........... 428/403–407
See application file for complete search history.

(56) References Cited

U.S. PATENT DOCUMENTS

| | | | |
|---|---|---|---|
| 5,032,546 A | 7/1991 | Giannelis et al. | 501/3 |
| 5,032,547 A | 7/1991 | Giannelis et al. | 501/3 |
| 5,202,152 A | 4/1993 | Giannelis et al. | 427/108 |
| 5,219,611 A | 6/1993 | Giannelis et al. | 427/162 |
| 5,260,094 A | 11/1993 | Giannelis et al. | 427/79 |
| 5,554,670 A | 9/1996 | Giannelis et al. | 523/209 |
| 5,955,535 A | 9/1999 | Vaia et al. | 524/791 |
| 6,010,805 A | 1/2000 | Scanlon, Jr. et al. | 429/307 |
| 6,225,374 B1 | 5/2001 | Vaia et al. | 523/216 |
| 7,148,282 B2 | 12/2006 | Giannelis et al. | 524/445 |
| 2005/0137287 A1 | 6/2005 | Giannelis et al. | 523/216 |
| 2007/0032585 A1 | 2/2007 | Giannelis et al. | 524/445 |
| 2007/0254994 A1 | 11/2007 | Giannelis et al. | 524/263 |
| 2008/0050857 A1 | 2/2008 | Wu et al. | 438/47 |

OTHER PUBLICATIONS

Zimmerman et al "The use of nonocomposite materials . . . " J. Photopolym. Sci. Technol., 21: 621-629, 2008.*
Blanc et al., "Hafnia colloidal solution from hydrothermal synthesis and membrane preparation," *J. European Ceram. Soc.*, 17:397-401, 1997.
Chumanov et al., "Nanocomposite liquids for 193 nm immersion lithography: a progress report," *Proc. SPIE*, 5753, 847-850, 2005.
French et al., "Immersion fluid refractive indices using prism minimum deviation techniques," *Proc. SPIE*, 5377, 1689-1694, 2004.
French et al., "Second generation fluids for 193nm immersion lithography," *Proc. SPIE*, 6154, 615415, 2006.
Santillan et al., "Novel high refractive index fluids for 193-nm immersion lithography," *Proc. SPIE*, 6154, 61544Q, 2006.
Sewell et al., "The next phase for immersion lithography," *Proc. SPIE*, 6154, 615406, 2006.
Switkes et al., Extending optics to 50 nm and beyond with immersion lithography *J. Vac. Sci. Technol. B.*, 21:2794-2799, 2003.
Wang et al., "High-refractive-index fluids for the next generation ArF immersion lithography," *Proc. SPIE*, 6153, 61530A, 2006.
Zimmerman et al., "The use of nanocomposite materials for high refractive for high index immersion lithography," *J. Photopolym. Sci. Technol.*, 21:621-629, 2008.

\* cited by examiner

*Primary Examiner* — Leszek Kiliman
(74) *Attorney, Agent, or Firm* — Fulbright & Jaworski LLP

(57) ABSTRACT

The present invention relates generally to non-aggregating nanoparticles, including ligand capped metal oxide nanoparticles. Methods for their synthesis and methods for their use, for example, for improved immersion lithography processes, are also disclosed.

26 Claims, 29 Drawing Sheets
(20 of 29 Drawing Sheet(s) Filed in Color)

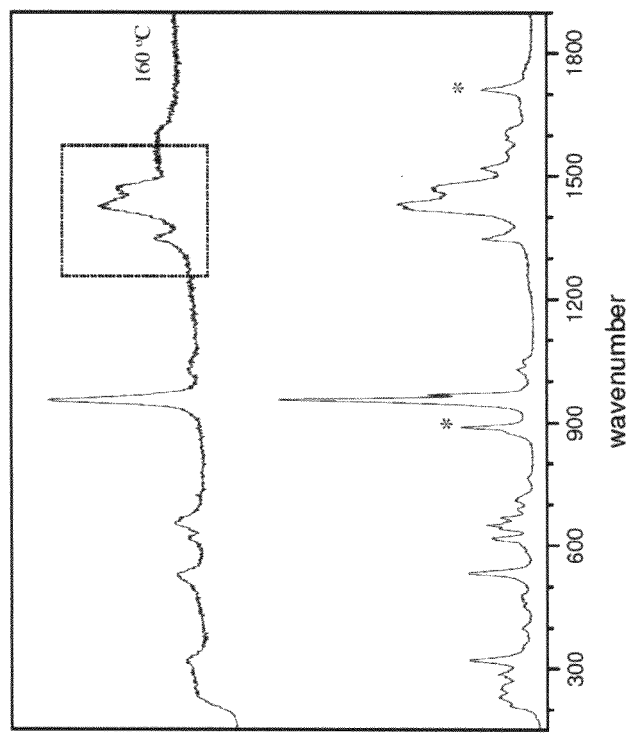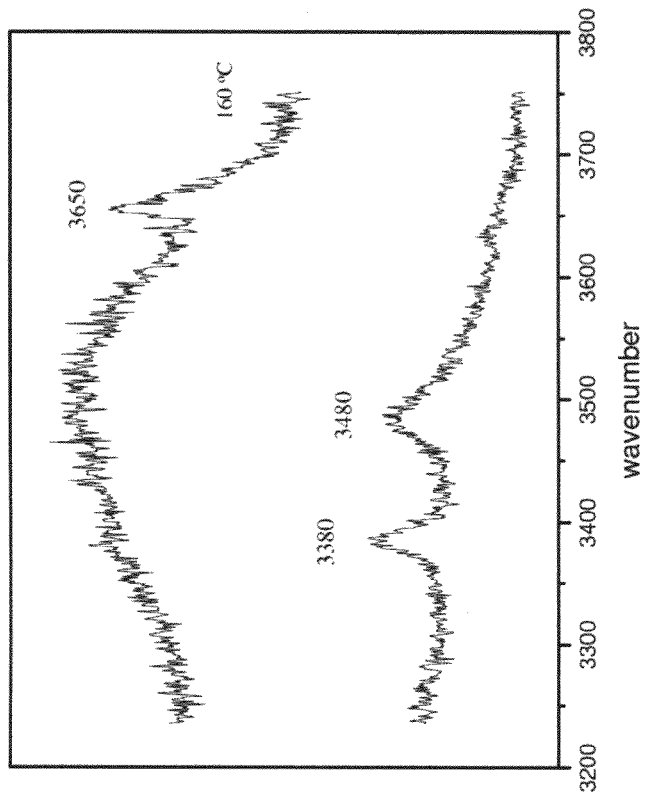
FIG. 14

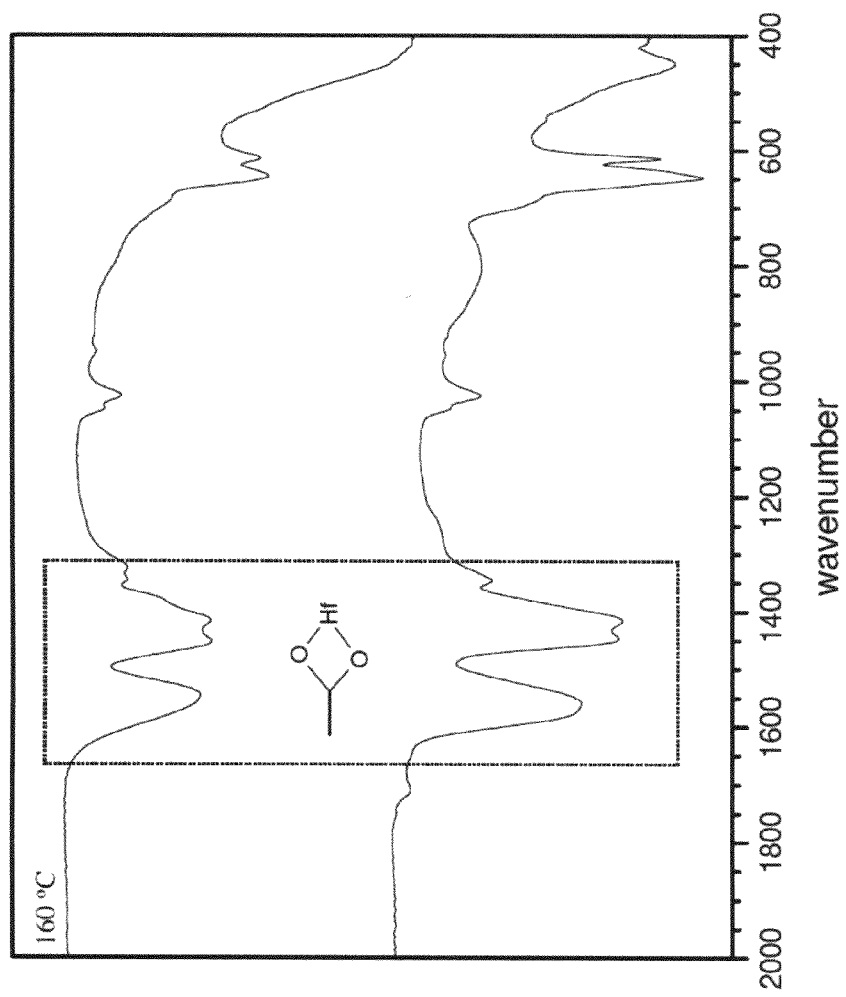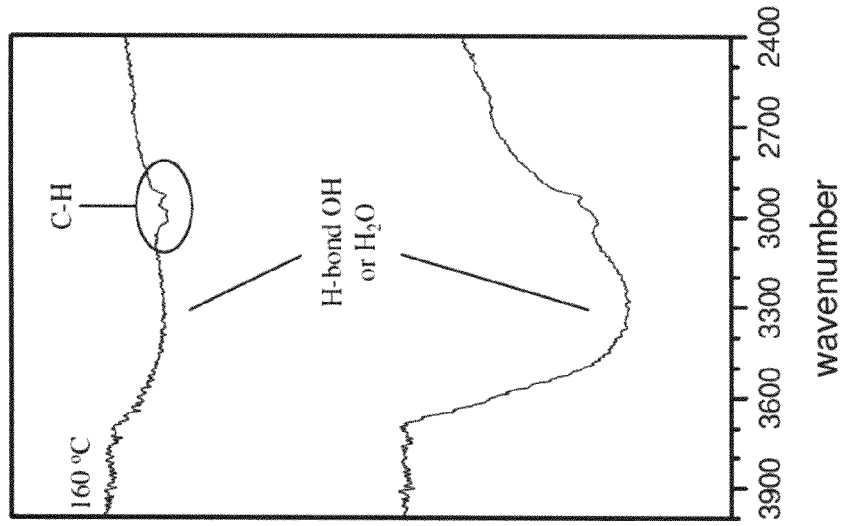
FIG. 15

NON-AGGREGATING NANOPARTICLES AND THE USE THEREOF

BACKGROUND OF THE INVENTION

I. Field of the Invention

The present disclosure generally relates to the field of semiconductors and semiconductor processing, and in particular, this disclosure provides, for example, non-aggregating metal oxide nanoparticles that may be used in some embodiments for the production of a high index immersion fluid for photoresists.

II. Description of Related Art

In semiconductor device fabrication, the various processing steps fall into four general categories: deposition, removal, patterning, and modification of electrical properties. Deposition is any process that grows, coats, or otherwise transfers a material onto the wafer. Removal processes are any that remove material from the wafer either in bulk or selectively and consist primarily of etch processes, either wet etching or dry etching. For example, chemical-mechanical planarization (CMP) is a removal process that is used for planarizing a semiconductor wafer or other substrate. Patterning covers the series of processes that shape or alter the existing shape of the deposited materials and is generally referred to as lithography. For example, in photolithography, the wafer is cleaned and coated with a chemical called a "photoresist". The photoresist is exposed by a "stepper", a machine that focuses, aligns, and moves the mask, exposing select portions of the wafer to short wavelength light. The unexposed regions are washed away by a developer solution. After etching or other processing, the remaining photoresist may be removed by plasma ashing. Modification of electrical properties includes doping transistor sources and drains, annealing which serves to activate the implanted dopants and reducing the dielectric constant in low-k insulating materials.

One of the major obstacles in the semiconductor device fabrication process is the elimination of defects. For example, in chemical mechanical planarization it is advantageous to use smaller particles because smaller particles allow polishing to smoother surfaces, but the smaller particles tend to aggregate together. These aggregates often leave scratches, causing an uneven surface topology. Immersion lithography presents another example of the semiconductor fabrication process in which it is advantageous to eliminate defects. Early studies focused on the elimination of bubbles in the immersion fluid, temperature and pressure variations in the immersion fluid, and immersion fluid absorption by the photoresist (Switkes et al., 2003). In both examples, the method chosen to eliminate the defects focused on improving the chemical and physical properties of the fluid used in that process. The improvement of the chemical and the physical properties of the immersion fluid is particularly important in immersion lithography.

Immersion lithography is a lithography enhancement technique that replaces the usual air gap between the final lens element and the photoresist surface with a liquid medium with a refractive index (RI) greater than one. Integrated circuit manufacturers have accepted 193 nm immersion lithography (193i) as a manufacturing patterning solution at least down to the 45 nm half-pitch node. The advantage of immersion lithography can by understood using the relation between the resolution (R) of the technique, the wavelength ($\lambda$) of the light source used and the numerical aperture (NA) of the lens:

$$R = k_1 \lambda / NA$$

where $k_1$ is a process dependent resolution factor. The numerical aperture can be expressed as $n_i \sin \theta_{max}$ where $n_i$ is the refractive index of the medium between the last lens element and the photoresist and $\theta_{max}$ is the aperture angle. Thus, the resolution can be written as:

$$R = k_1 \lambda / n_i \sin \theta_{max}$$

which clearly shows that resolution is decreased when the refractive index of the immersion fluid is increased. As a result, a significant increase in the refractive index of the fluid could push immersion lithography down to the 32 nm half-pitch node. Water, with a refractive index $n_w = 1.44$ at 193 nm was initially used as a first generation immersion fluid. With water immersion, a maximum numerical aperture approaching $n_w = 1.44$ becomes possible. Water immersion scanners (193 nm) with numerical apertures of 1.3 or 1.35 are already commercially available. They can provide lithography solutions for line-and-space features as small as 45 nm half-pitch. But in order to achieve the 32 nm half-pitch node a 193 nm scanner with NA of at least 1.65 is needed (Sewell et al., 2006). The use of second generation fluids with a refractive index of approximately 1.65 leads to a numerical aperture around 1.5. However, to reach a numerical aperture close to 1.7, it is necessary to increase the refractive index of fluid.

Two different methods have been used to produce high-index fluids: a) addition of high refractive index additives in water and b) development of an organic, single component fluid (Wang et al., 2006). Organic fluids are usually based on cycloalkanes like decalin (French et al., 2006). However, there are issues with the chemical stability of these organic fluids, since they are susceptible to degradation upon exposure to atmosphere or during exposure to 193 nm radiation (Zimmerman et al., 2008). Other than chemical stability, the features that are necessary for the application of an immersion fluid are low absorption at 193 nm and viscosity that is not much higher than that of water. Aqueous based fluids containing nanoparticles are more likely to meet these requirements than organic based fluids (Chumanov et al., 2005; Rice, 2008). However, to realize these aqueous fluids, the nanoparticles should be smaller than 5 nm and should be made of a high refractive index material.

Additionally, the development of a high numerical aperture system requires a next generation photoresist that will be used in combination with the immersion fluid. The refractive index of this photoresist should be higher than 1.8. Initial approaches involved the insertion of highly polarizable atoms, like sulfur or phosphorus, on the organic compounds of the photoresist (Zimmerman et al., 2008). Also, using inorganic additives, like nanoparticles, in the immersion fluid, can be used to increase the refractive index of the photoresist.

Small and highly refractive index nanoparticles have chemical and physical properties that would eliminate the defects associated with slurries used in CMP. New polishing or cleaning processes are needed to achieve consistent nanoscale smoothness across larger diameter wafers in order to use these wafers to make, for example, 22 nm devices. Current 300 nm wafers are not smooth enough for these next-generation features. Additionally, 450 mm wafers may require making a surface with even less surface roughness across a 50% larger substrate, with more edge roll off, which will be markedly more difficult. Slurries comprising small nanoparticles will allow polishing to create smoother surfaces, but without defects since these smaller nanoparticles tend not aggregate.

SUMMARY OF THE INVENTION

In some aspects, the present disclosure provides novel compositions, including nanoparticles comprising:

a) a core comprising a Group 4 metal oxide; and
b) a coating surrounding the cores, where the coatings comprises a ligand.

In some embodiments, the Group 4 metal oxide is $HfO_2$. In other embodiments, the Group 4 metal oxide is $ZrO_2$. In further embodiments, the Group 4 metal oxide is $TiO_2$. In some embodiments, the elemental weight percentage of the core is approximately from about 55% to about 76% hafnium oxide. In other embodiments, the elemental weight percentage of the core is approximately from about 41% to about 67% zirconium oxide. In further embodiments, the elemental weight percentage of the core is approximately from about 31% to about 59% titanium oxide.

In some embodiments, the nanoparticle has a diameter from about 0.7 nm to about 5 nm. In some embodiments, the nanoparticle has a diameter from about 1 nm to about 4 nm. In some embodiments, the nanoparticle has a diameter from about 1 nm to about 2 nm. In some embodiments, the nanoparticle has a diameter from about 2 nm up to 25 nm. For example, the nanoparticle can have a diameter of about 1 nm.

In some embodiments, the ligand is a carboxylate$_{(C1-16)}$ or an acid thereof. In some embodiments, the ligand is acetate or acetic acid. In some embodiments, the ligand is propanoic acid, hexanoic acid, nonanoic acid, myristic acid, or a salt of any of these acids. In some embodiments, the ligand is methacrylate or methacrylic acid. In some embodiments, the ligand is tartarate or an ester or acid thereof. In some embodiments, the ligand is O,O'-di-pivaloyl-L-tartrate or an ester or acid thereof. In some embodiments, the ligand is an amino acid or salt thereof. In some embodiments, the ligand is histidine or phenyl alanine. In some embodiments, the ligand is a halide or halide containing species. For example, the ligand can be chloride or bromide or perchororate. In embodiments, the ligand is a dialkylphosphonate$_{(C1-16)}$ or other phosphourus containing ligand. In some embodiments, the ligand is selected from the group consisting of:

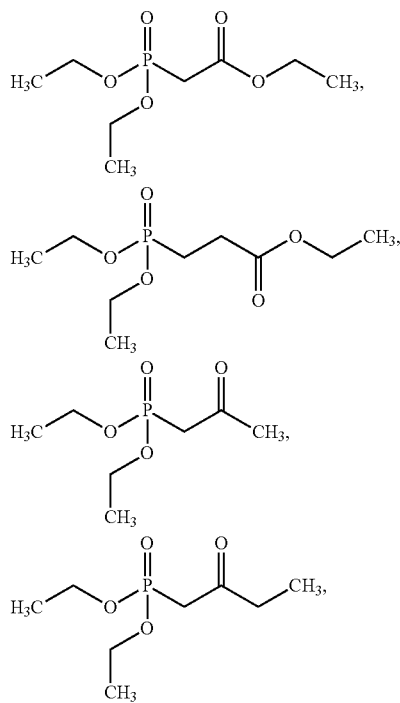

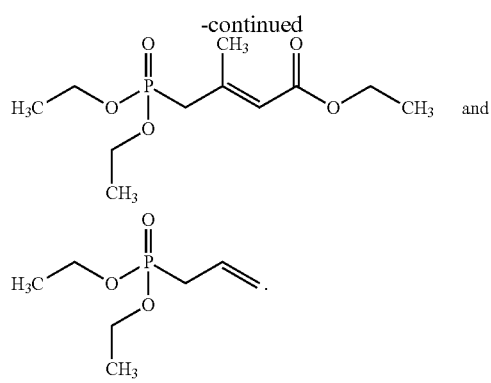

In some embodiments, the ligand is phosphate or an acid or ester thereof. In some embodiments, the nanoparticle comprises a second ligand.

In some embodiments, the Group 4 metal oxide is $HfO_2$ and the ligand is acetate. In some variations thereof, the amount of $HfO_2$ is from about 55% to about 76% percent by weight.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings form part of the present specification and are included to further demonstrate certain aspects of the present disclosure. The invention may be better understood by reference to one of these drawings in combination with the detailed description of specific embodiments presented herein.

FIG. 14 shows the Raman spectrum of $HfO_2$ acetate dispersed in acetone and then air dried at 160° C. After 3h at 160° C. (top spectrum) the peaks corresponding to free acetic acid (*) disappear. Significant changes are also observed in the hydroxyl region.

FIG. 15 shows the IR spectrum of $HfO_2$ acetate dissolved in water and then vacuum dried at 50° C. (bottom spectrum). Hf-acetate dried from aqueous solution has a simpler spectra (bottom and top spectra), consistent with bidentate acetate only present and H-bonded OH and water. After heating for 3 h at 160° C. some acetate is removed and the hydroxyls are significantly reduced.

FIGS. 20A & 21B show NMR spectra of $HfO_2$-acetate nanoparticles in $D_2O$ (FIG. 20A) and $HfO_2$-MAA in $CDCl_3$ (FIG. 20B).

FIGS. 21A-C show a non-limiting schematic of the ligand exchange reaction (FIG. 21A), the results of a size measurement comparison between $HfO_2$-acetate (left trace) and $HfO_2$-MTBS (right trace) (FIG. 21B), and solubility result of 5% w/w $HfO_2$-MTBS in PGMEA (FIG. 21C).

DESCRIPTION OF ILLUSTRATIVE EMBODIMENTS

I. DEFINITIONS

Figure 1:
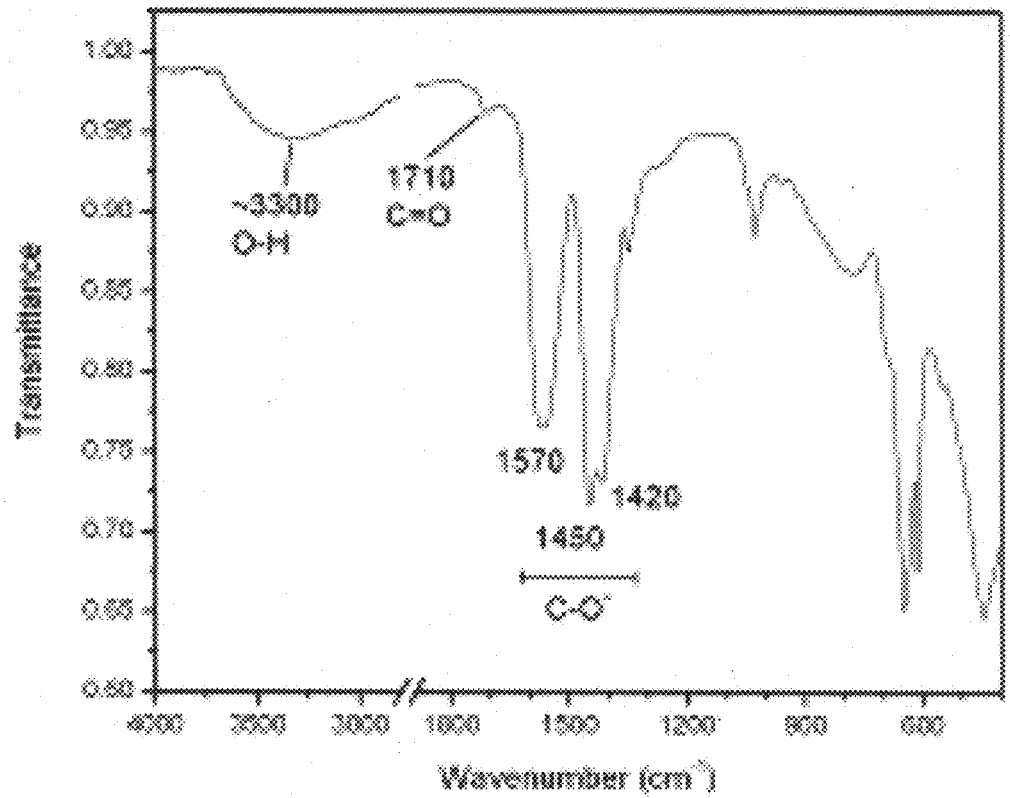
FIG. 1 shows the infrared (IR) spectrum of the metal oxide powder obtained from hafnium isopropoxide in the presence of acetic acid.

When used in the context of a chemical group, "hydrogen" means —H; "hydroxy" means —OH; "oxo" means =O; "halo" means independently —F, —Cl, —Br or —I; "amino" means —$NH_2$ (see below for definitions of groups containing the term amino, e.g., alkylamino); "nitro" means —$NO_2$; "cyano" means —CN; "phosphate" means $PO_4^{3-}$.

For the groups below, the following parenthetical subscripts further define the groups as follows: "(Cn)" defines the exact number (n) of carbon atoms in the group. "(C≤n)" defines the maximum number (n) of carbon atoms that can be in the group, with the minimum number of carbon atoms in such at least one, but otherwise as small as possible for the group in question. E.g., it is understood that the minimum number of carbon atoms in the group "alkenyl$_{(c≤8)}$" is two. For example, "alkoxy$_{(c≤10)}$" designates those alkoxy groups having from 1 to 10 carbon atoms (e.g., 1, 2, 3, 4, 5, 6, 7, 8, 9, or 10, or any range derivable therein (e.g., 3 to 10 carbon atoms). (Cn-n') defines both the minimum (n) and maximum number (n') of carbon atoms in the group. Similarly, "alkyl$_{(C2-10)}$" designates those alkyl groups having from 2 to 10 carbon atoms (e.g., 2, 3, 4, 5, 6, 7, 8, 9, or 10, or any range derivable therein (e.g., 3 to 10 carbon atoms)).

The term "alkyl" when used without the "substituted" modifier refers to a non-aromatic monovalent group with a saturated carbon atom as the point of attachment, a linear or branched, cyclo, cyclic or acyclic structure, no carbon-carbon double or triple bonds, and no atoms other than carbon and hydrogen. The groups, —$CH_3$ (Me), —$CH_2CH_3$ (Et), —$CH_2CH_2CH_3$ (n-Pr), —$CH(CH_3)_2$ (iso-Pr), —$CH(CH_2)_2$ (cyclopropyl), —$CH_2CH_2CH_2CH_3$ (n-Bu), —$CH(CH_3)CH_2CH_3$ (sec-butyl), —$CH_2CH(CH_3)_2$ (iso-butyl), —$C(CH_3)_3$ (tert-butyl), —$CH_2C(CH_3)_3$ (neo-pentyl), cyclobutyl, cyclopentyl, cyclohexyl, and cyclohexylmethyl are non-limiting examples of alkyl groups. The term "substituted alkyl" refers to a non-aromatic monovalent group with a saturated carbon atom as the point of attachment, a linear or branched, cyclo, cyclic or acyclic structure, no carbon-carbon double or triple bonds, and at least one atom independently selected from the group consisting of N, O, F, Cl, Br, I, Si, P, and S. The following groups are non-limiting examples of substituted alkyl groups: —$CH_2OH$, —$CH_2Cl$, —$CH_2Br$, —$CH_2SH$, —$CF_3$, —$CH_2CN$, —$CH_2C(O)H$, —$CH_2C(O)OH$, —$CH_2C(O)OCH_3$, —$CH_2C(O)NH_2$, —$CH_2C(O)NHCH_3$, —$CH_2C(O)CH_3$, —$CH_2OCH_3$, —$CH_2OCH_2CF_3$, —$CH_2OC(O)CH_3$, —$CH_2NH_2$, —$CH_2NHCH_3$, —$CH_2N(CH_3)_2$, —$CH_2CH_2Cl$, —$CH_2CH_2OH$, —$CH_2CF_3$, —$CH_2CH_2OC(O)CH_3$, —$CH_2CH_2NHCO_2C(CH_3)_3$, and —$CH_2Si(CH_3)_3$.

The term "alkanediyl" when used without the "substituted" modifier refers to a non-aromatic divalent group, wherein the alkanediyl group is attached with two σ-bonds, with one or two saturated carbon atom(s) as the point(s) of attachment, a linear or branched, cyclo, cyclic or acyclic structure, no carbon-carbon double or triple bonds, and no atoms other than carbon and hydrogen. The groups, —CH$_2$-(methylene), —CH$_2$CH$_2$—, —CH$_2$C(CH$_3$)$_2$CH$_2$—, —CH$_2$CH$_2$CH$_2$—, and

are non-limiting examples of alkanediyl groups. The term "substituted alkanediyl" refers to a non-aromatic monovalent group, wherein the alkynediyl group is attached with two σ-bonds, with one or two saturated carbon atom(s) as the point(s) of attachment, a linear or branched, cyclo, cyclic or acyclic structure, no carbon-carbon double or triple bonds, and at least one atom independently selected from the group consisting of N, O, F, Cl, Br, I, Si, P, and S. The following groups are non-limiting examples of substituted alkanediyl groups: —CH(F)—, —CF$_2$—, —CH(Cl)—, —CH(OH)—, —CH(OCH$_3$)—, and —CH$_2$CH(Cl)—.

The term "alkenyl" when used without the "substituted" modifier refers to a monovalent group with a nonaromatic carbon atom as the point of attachment, a linear or branched, cyclo, cyclic or acyclic structure, at least one nonaromatic carbon-carbon double bond, no carbon-carbon triple bonds, and no atoms other than carbon and hydrogen. Non-limiting examples of alkenyl groups include: —CH═CH$_2$ (vinyl), —CH═CHCH$_3$, —CH═CHCH$_2$CH$_3$, —CH$_2$CH═CH$_2$ (allyl), —CH$_2$CH═CHCH$_3$, and —CH═CH—C$_6$H$_5$. The term "substituted alkenyl" refers to a monovalent group with a nonaromatic carbon atom as the point of attachment, at least one nonaromatic carbon-carbon double bond, no carbon-carbon triple bonds, a linear or branched, cyclo, cyclic or acyclic structure, and at least one atom independently selected from the group consisting of N, O, F, Cl, Br, I, Si, P, and S. The groups, —CH═CHF, —CH═CHCl and —CH═CHBr, are non-limiting examples of substituted alkenyl groups.

The term "aryl" when used without the "substituted" modifier refers to a monovalent group with an aromatic carbon atom as the point of attachment, said carbon atom forming part of one or more six-membered aromatic ring structure(s) wherein the ring atoms are all carbon, and wherein the monovalent group consists of no atoms other than carbon and hydrogen. Non-limiting examples of aryl groups include phenyl (Ph), methylphenyl, (dimethyl)phenyl, —C$_6$H$_4$CH$_2$CH$_3$ (ethylphenyl), —C$_6$H$_4$CH$_2$CH$_2$CH$_3$ (propylphenyl), —C$_6$H$_4$CH(CH$_3$)$_2$, —C$_6$H$_4$CH(CH$_2$)$_2$, —C$_6$H$_3$(CH$_3$)CH$_2$CH$_3$ (methylethylphenyl), —C$_6$H$_4$CH═CH$_2$ (vinylphenyl), —C$_6$H$_4$CH═CHCH$_3$, —C$_6$H$_4$C≡CH, —C$_6$H$_4$C≡CCH$_3$, naphthyl, and the monovalent group derived from biphenyl. The term "substituted aryl" refers to a monovalent group with an aromatic carbon atom as the point of attachment, said carbon atom forming part of one or more six-membered aromatic ring structure(s) wherein the ring atoms are all carbon, and wherein the monovalent group further has at least one atom independently selected from the group consisting of N, O, F, Cl, Br, I, Si, P, and S, Non-limiting examples of substituted aryl groups include the groups: —C$_6$H$_4$F, —C$_6$H$_4$Cl, —C$_6$H$_4$Br, —C$_6$H$_4$I, —C$_6$H$_4$OH, —C$_6$H$_4$OCH$_3$, —C$_6$H$_4$OCH$_2$CH$_3$, —C$_6$H$_4$OC(O)CH$_3$, —C$_6$H$_4$NH$_2$, —C$_6$H$_4$NHCH$_3$, —C$_6$H$_4$N(CH$_3$)$_2$, —C$_6$H$_4$CH$_2$OH, —C$_6$H$_4$CH$_2$OC(O)CH$_3$, —C$_6$H$_4$CH$_2$NH$_2$, —C$_6$H$_4$CF$_3$, —C$_6$H$_4$CN, —C$_6$H$_4$CHO, —C$_6$H$_4$CHO, —C$_6$H$_4$C(O)CH$_3$, —C$_6$H$_4$C(O)C$_6$H$_5$, —C$_6$H$_4$CO$_2$H, —C$_6$H$_4$CO$_2$CH$_3$, —C$_6$H$_4$CONH$_2$, —C$_6$H$_4$CONHCH$_3$, and —C$_6$H$_4$CON(CH$_3$)$_2$.

The term "heteroaryl" when used without the "substituted" modifier refers to a monovalent group with an aromatic carbon atom or nitrogen atom as the point of attachment, said carbon atom or nitrogen atom forming part of an aromatic ring structure wherein at least one of the ring atoms is nitrogen, oxygen or sulfur, and wherein the monovalent group consists of no atoms other than carbon, hydrogen, aromatic nitrogen, aromatic oxygen and aromatic sulfur. Non-limiting examples of aryl groups include acridinyl, furanyl, imidazoimidazolyl, imidazopyrazolyl, imidazopyridinyl, imidazopyrimidinyl, indolyl, indazolinyl, methylpyridyl, oxazolyl, phenylimidazolyl, pyridyl, pyrrolyl, pyrimidyl, pyrazinyl, quinolyl, quinazolyl, quinoxalinyl, tetrahydroquinolinyl, thienyl, triazinyl, pyrrolopyridinyl, pyrrolopyrimidinyl, pyrrolopyrazinyl, pyrrolotriazinyl, pyrroloimidazolyl, chromenyl (where the point of attachment is one of the aromatic atoms), and chromanyl (where the point of attachment is one of the aromatic atoms). The term "substituted heteroaryl" refers to a monovalent group with an aromatic carbon atom or nitrogen atom as the point of attachment, said carbon atom or nitrogen atom forming part of an aromatic ring structure wherein at least one of the ring atoms is nitrogen, oxygen or sulfur, and wherein the monovalent group further has at least one atom independently selected from the group consisting of non-aromatic nitrogen, non-aromatic oxygen, non aromatic sulfur F, Cl, Br, I, Si, and P.

The term "acyl" when used without the "substituted" modifier refers to a monovalent group with a carbon atom of a carbonyl group as the point of attachment, further having a linear or branched, cyclo, cyclic or acyclic structure, further having no additional atoms that are not carbon or hydrogen, beyond the oxygen atom of the carbonyl group. The groups, —CHO, —C(O)CH$_3$ (acetyl, Ac), —C(O)CH$_2$CH$_3$, —C(O)CH$_2$CH$_2$CH$_3$, —C(O)CH(CH$_3$)$_2$, —C(O)CH(CH$_2$)$_2$, —C(O)C$_6$H$_5$, —C(O)C$_6$H$_4$CH$_3$, —C(O)C$_6$H$_4$CH$_2$CH$_3$, —COC$_6$H$_3$(CH$_3$)$_2$, and —C(O)CH$_2$C$_6$H$_5$, are non-limiting examples of acyl groups. The term "acyl" therefore encompasses, but is not limited to groups sometimes referred to as "alkyl carbonyl" and "aryl carbonyl" groups. The term "substituted acyl" refers to a monovalent group with a carbon atom of a carbonyl group as the point of attachment, further having a linear or branched, cyclo, cyclic or acyclic structure, further having at least one atom, in addition to the oxygen of the carbonyl group, independently selected from the group consisting of N, O, F, Cl, Br, I, Si, P, and S. The groups, —C(O)CH$_2$CF$_3$, —CO$_2$H (carboxyl), —CO$_2$CH$_3$ (methylcarboxyl), —CO$_2$CH$_2$CH$_3$, —CO$_2$CH$_2$CH$_2$CH$_3$, —CO$_2$C$_6$H$_5$, —CO$_2$CH(CH$_3$)$_2$, —CO$_2$CH(CH$_2$)$_2$, —C(O)NH$_2$ (carbamoyl), —C(O)NHCH$_3$, —C(O)NHCH$_2$CH$_3$, —CONHCH(CH$_3$)$_2$, —CONHCH(CH$_2$)$_2$, —CON(CH$_3$)$_2$, —CONHCH$_2$CF$_3$, —CO-pyridyl, —CO-imidazoyl, and —C(O)N$_3$, are non-limiting examples of substituted acyl groups. The term "substituted acyl" encompasses, but is not limited to, "heteroaryl carbonyl" groups.

The term "carboxylate" when used without the "substituted" modifier refers to a monovalent anion having the formula R—O$^-$, wherein R is an acyl as that group is defined above. Non-limiting examples of carboxylate anions include acetate, propionate and butyrate. The term "substituted carboxylate" refers to the group R—O$^-$, in which R is a substituted acyl, as that term is defined above.

The term "dialkylphosphonate" when used without the "substituted" modifier refers to a compound, defined as (RO)(R'O)P(O)R", in which R, R' and R" can be the same or different alkyl groups, or any combination of two of R, R' and R" can be taken together to represent an alkanediyl. The term "substituted dialkylphosphonate" refers to (RO)(R'O)P(O)R", in which at least one of R, R' and R" is a substituted alkyl or two of R, R' and R" can be taken together to represent a substituted alkanediyl.

Any undefined valency on an atom of a structure shown in this application implicitly represents a hydrogen atom bonded to the atom.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result.

The term "analog" as used herein, is understood as being a substance which does not comprise the same basic carbon skeleton and carbon functionality in its structure as a "given compound", but which can mimic the given compound by incorporating one or more appropriate substitutions such as for example substituting carbon for heteroatoms.

An "isomer" of a first compound is a separate compound in which each molecule contains the same constituent atoms as the first compound, but where the configuration of those atoms in three dimensions differs.

The term "saturated" when referring to an atom means that the atom is connected to other atoms only by means of single bonds.

The above definitions supersede any conflicting definition in any of the reference that is incorporated by reference herein. The fact that certain terms are defined, however, should not be considered as indicative that any term that is undefined is indefinite.

Rather, all terms used are believed to describe the invention in terms such that one of ordinary skill can appreciate the scope and practice the present invention.

II. SYNTHETIC METHODS

Methods of making the compositions of matter disclosed herein are described in the Examples section, below. For example, acetate capped $HfO_2$ can be synthesized from hafnium isopropoxide and acetic acid. Typically the initial $HfO_2$-acetate powder contains free acetic acid that can be removed by heating at 160° C. or by dissolving in water and then drying at 50° C. Further heating of water dried sample typically leads to hydroxyl condensation. This is evidenced by examining the IR and Raman spectra and further consistent with elemental analysis results.

For example, it was determined using elemental analysis, that dissolving an initial $HfO_2$-acetate powder in water results in a decrease of carbon content. The Hf/C ratio increases from 2.6 to 5.7. Initially several carboxyl (monodentate, bidentate, free acetic acid) and hydroxyl groups (C—OH, Hf—OH, Hf—OH—Hf) are present, evidenced by examining the IR and Raman spectra. After 3 hours at 160° C. free acetic acid is removed and the free hydroxyls are significantly reduced and the significant species present is the bidentate species.

Additional aspects of these methods are further elaborated below, e.g., the effect of varying the metal oxide ligands on the ability to function as a high index immersion fluid, ability to function as a positive or negative photoresist, and ability to function as a high quality CMP slurry. In general, the methods provided in the Examples section can be further modified and optimized using the principles and techniques of inorganic chemistry as applied by a person skilled in the art. Such principles and techniques are taught, for example, in *Handbook of Inorganic Chemicals*, by Pradyot Patnaik (2002) or *Kirk-Othmer Encyclopedia of Chemical Technology*, 5th Edition by R. E. Kirk, J. Kroschwitz, D. Othmer, K. Othmer and A. Seidel (2005), both of which are incorporated herein in their entireties.

III. HIGH INDEX IMMERSION FLUID CONTAINING METAL OXIDE NANOPARTICLES

Several different approaches may be used to incorporate metal oxide nanoparticles in water. For example, the approaches used to incorporate large amounts of hafnium oxide nanoparticles in water include: a) hydrolysis in acetic acid or in mixed alcohol-water solvents, b) alcoholysis using a series of different alcohols and c) solid state ageing of $HfOCl_2$.

The metal oxide nanoparticle may, in certain embodiments, include hafnium. In some embodiments, the final product of the hafnium species synthesized from the hafnium isopropoxide in the presence of acetic acid is a fine white powder that is easily dispersed in water at high concentrations. The yield of the synthesis is about 0.7 g of powder per 1.0 g of hafnium isopropoxide used. Hydrolysis and condensation of the isopropoxide in the presence of acetic acid leads to the formation of a Hf—O—Hf network similar to hafnium oxide containing both OH and acetate groups. As shown in FIG. 1, the Fourier transform infrared spectroscopy (FTIR) shows strong peaks characteristic of an acetate functional group. These are the asymmetric and symmetric stretch of the acetate at 1450 $cm^{-1}$ and 1570 $cm^{-1}$ as well as a weak peak at 1710 $cm^{-1}$ which corresponds to the C=O double bond of a protonated carboxylic acid. These results indicate that both the anionic and the protonated form of acetic acid are present. Additionally, a broad peak appearing around 3300 $cm^{-1}$ could be attributed either to hydroxy (OH) groups that are bridging the hafnium atoms or to water that is bound on the nanoparticles. Due to the low synthesis temperature, noncrystalline species with a large number of uncondensed OH groups are expected.

Figure 2:
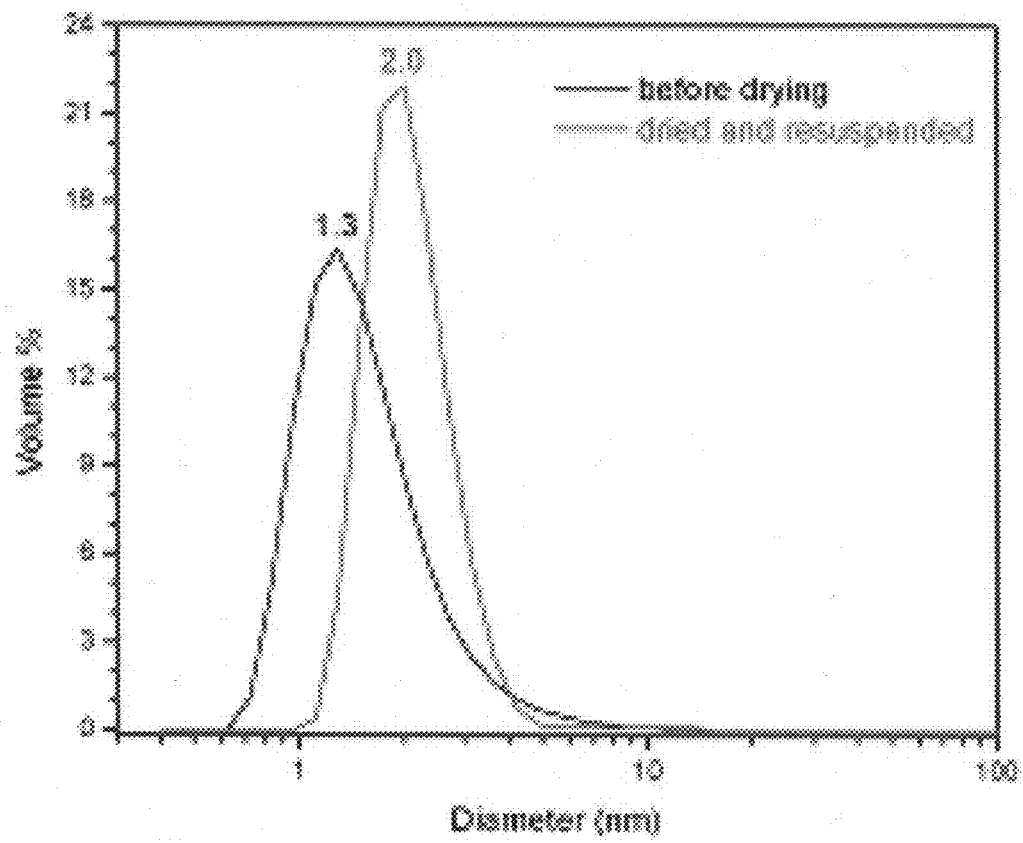
FIG. 2 shows the dynamic light scattering (DLS) of the metal oxide powder as a dilute aqueous suspension.

The size distribution of a dilute suspension of the nanoparticles in water as measured by dynamic light scattering (DLS) is also shown in FIG. 2. A sample that was prepared by dispersing the nanoparticles in water immediately after washing the nanoparticles with acetone shows a size distribution that peaks at 1.3 nm. On the other hand, after the sample is dried and then resuspended in water the distribution is narrower and shows a maximum at 2.0 nm. Sizes in the range of 1-2 nm are ideal for the application of the nanoparticles as an additive in the immersion fluid for 193i, since the scattering of light by such small particles is minimized. Additionally, quantum confinement effects result in blue shift of the absorption peak as the size of the particles gets smaller. Also, the dynamic light scattering results show that it is possible to control the particle size during the drying of the sample.

Figure 3:
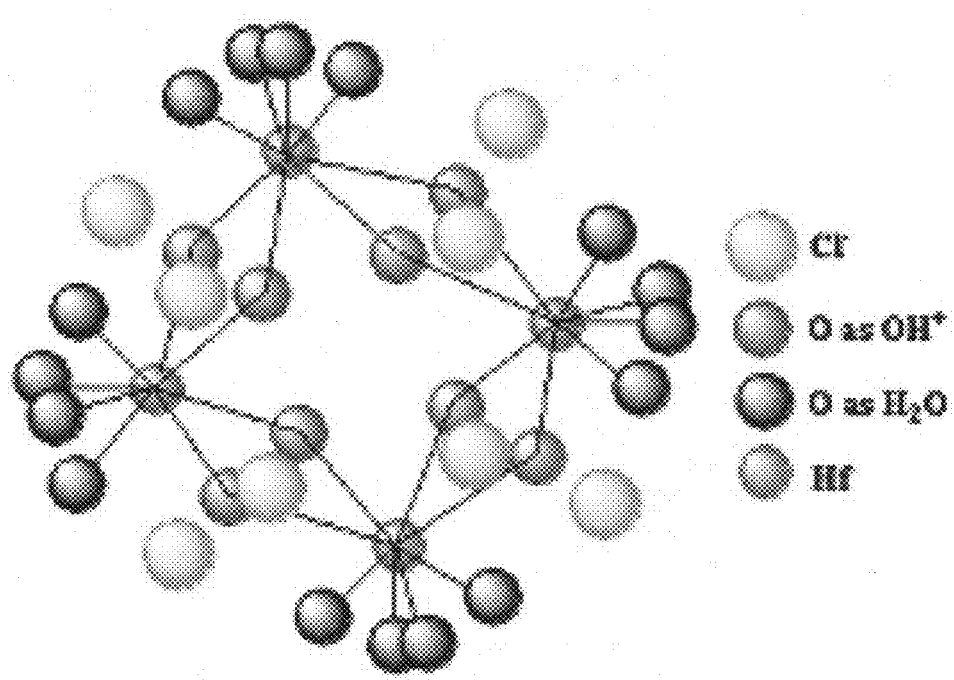
FIG. 3 shows the schematic representation of the structure of a tetranuclear hafnium cluster.
Figure 4:
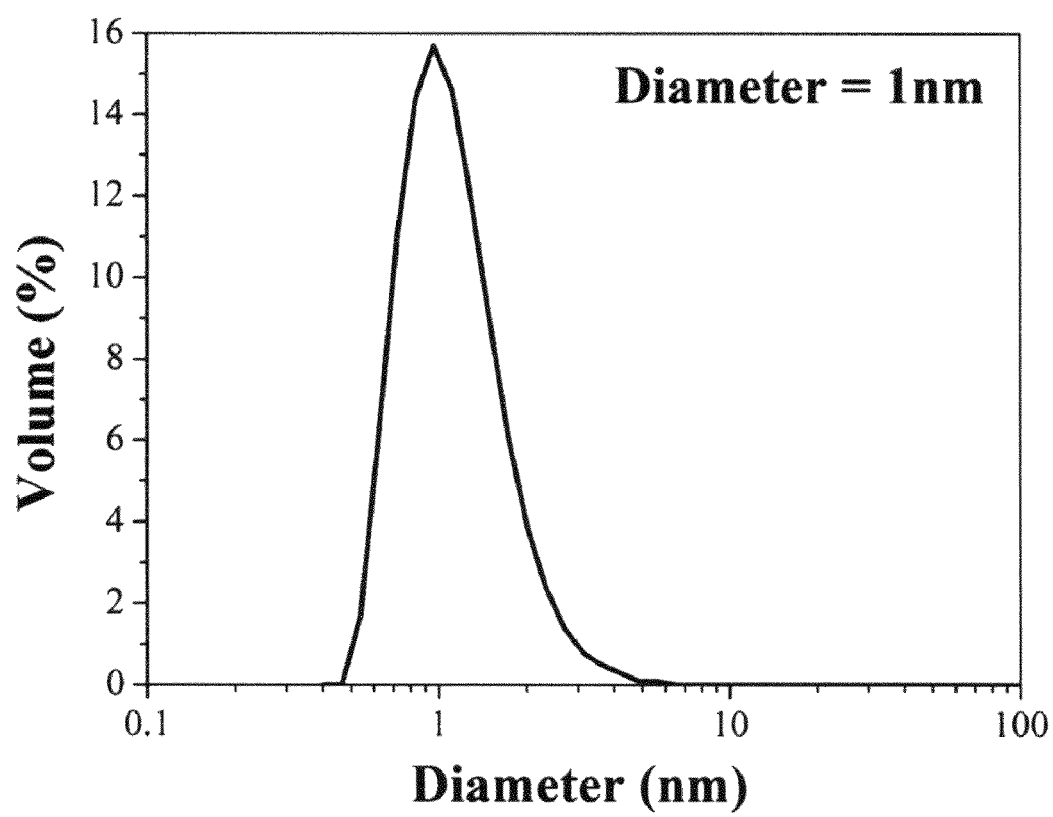
FIG. 4 shows the particle size distribution for particles obtained from $HfOCl_2$.

When $HfOCl_2$ is dissolved in water it forms tetranuclear clusters like the ones shown in FIG. 3 (Blanc et al., 1997; Clearfield, 1990). These clusters have a positive charge that is counterbalanced by chloride anions. The preparation of a fluid using $HfOCl_2$ as a precursor involves heating $HfOCl_2$ at 80° C. before adding water. During this step, hydrogen chloride is released. This release of hydrogen chloride confirms that condensation of the hafnium species has occurred. Eventually, when water is added, two or more tetranuclear clusters are condensed to form larger species. These polynuclear species have a similar structure as the tetranuclear unit shown on FIG. 3, but the hafnium to chloride ratio is higher, since chloride was removed as hydrogen chloride during the heating step. As shown in FIG. 4, the size distribution for this system ranges from less than 1.0 nm to 4.0 nm.

Figure 5:
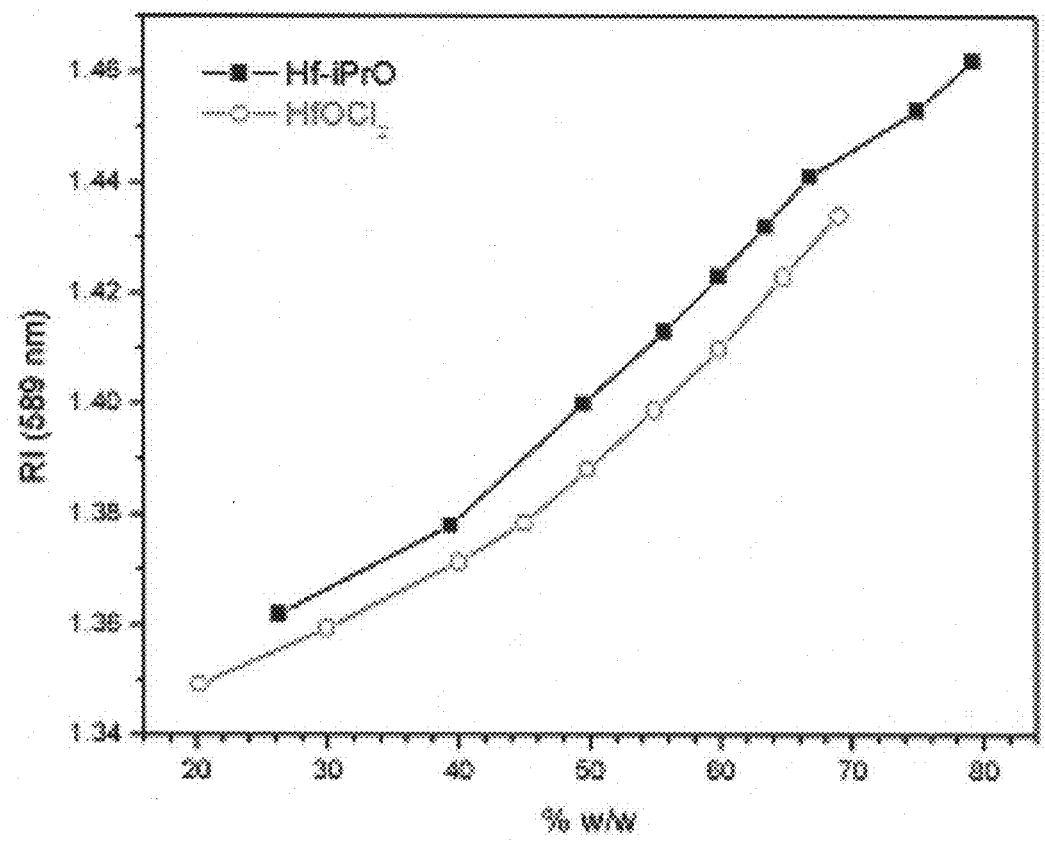
FIG. 5 shows the refractive index at 589 nm versus hafnium loading for the systems based on the Hf-isopropoxide (Hf-iPrO) and $HfOCl_2$ fluids.

The addition of the hafnium species in water results in an increase of the refractive index relative to water with refractive index of 1.333 at 589 nm. As shown in FIG. 5, the nanoparticles synthesized from hafnium isopropoxide can be dispersed at concentrations as high as 80% w/w giving a refractive index of 1.462. The nanoparticles synthesized from $HfOCl_2$ give a refractive index of 1.434 when dispersed at 69% w/w. The refractive index of both fluids follows the Lorentz-Lorenz equation:

$$\frac{n_f^2 - 1}{n_f^2 + 2} = V_s \frac{n_s^2 - 1}{n_s^2 + 2} + (1 - V_s) \frac{n_m^2 - 1}{n_m^2 + 2}$$

where $n_f$, $n_s$ and $n_m$ are the refractive indices of the fluid, the nanoparticles and the medium respectively and $V_s$ is the volume fraction of the nanoparticles in the fluid. The loadings achieved with either precursor correspond to volume fractions around 20% v/v.

Figure 6:
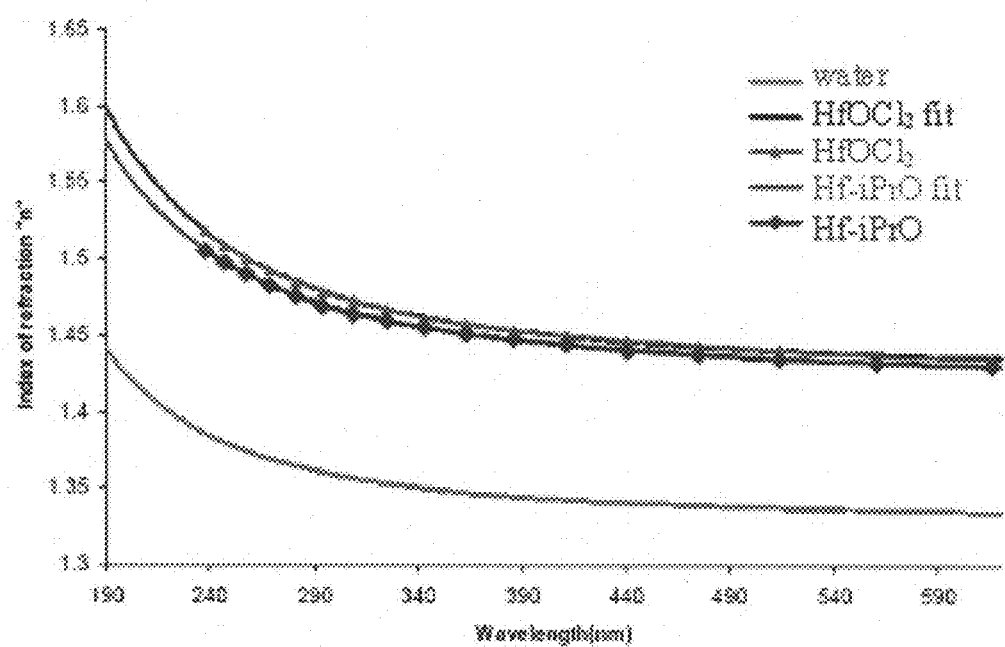
FIG. 6 shows the spectral index measurements and Cauchy fits for the fluids based on the Hf-isopropoxide (65%) and $HfOCl_2$ (68%).

In some embodiments, the fluids containing the metal oxide nanoparticles are used in 193 nm immersion lithography. Therefore, it is necessary to measure the refractive indices at 193 nm should be measured for each fluid. The minimum deviation prism method was used to measure the refractive index at different wavelengths down to the point where absorbance interferes with the measurement (French et al., 2004). The spectral index measurements for both fluids are shown in FIG. 6. Using the Cauchy model the data were fitted in order to extrapolate the curve down to 193 nm. The sample based on $HfOCl_2$ (68% w/w) has a refractive index of 1.590 at 193 nm. The refractive index at 589 nm measured with the same method is 1.436 resulting in a difference Δn of 0.154. For the sample based on Hf-isopropoxide (65 w/w) the indices are 1.568 and 1.431 at 193 nm and 589 nm, respectively. The difference (Δn) for this sample is 0.137. A fluid containing 80% w/w was recently synthesized.

Figure 7:
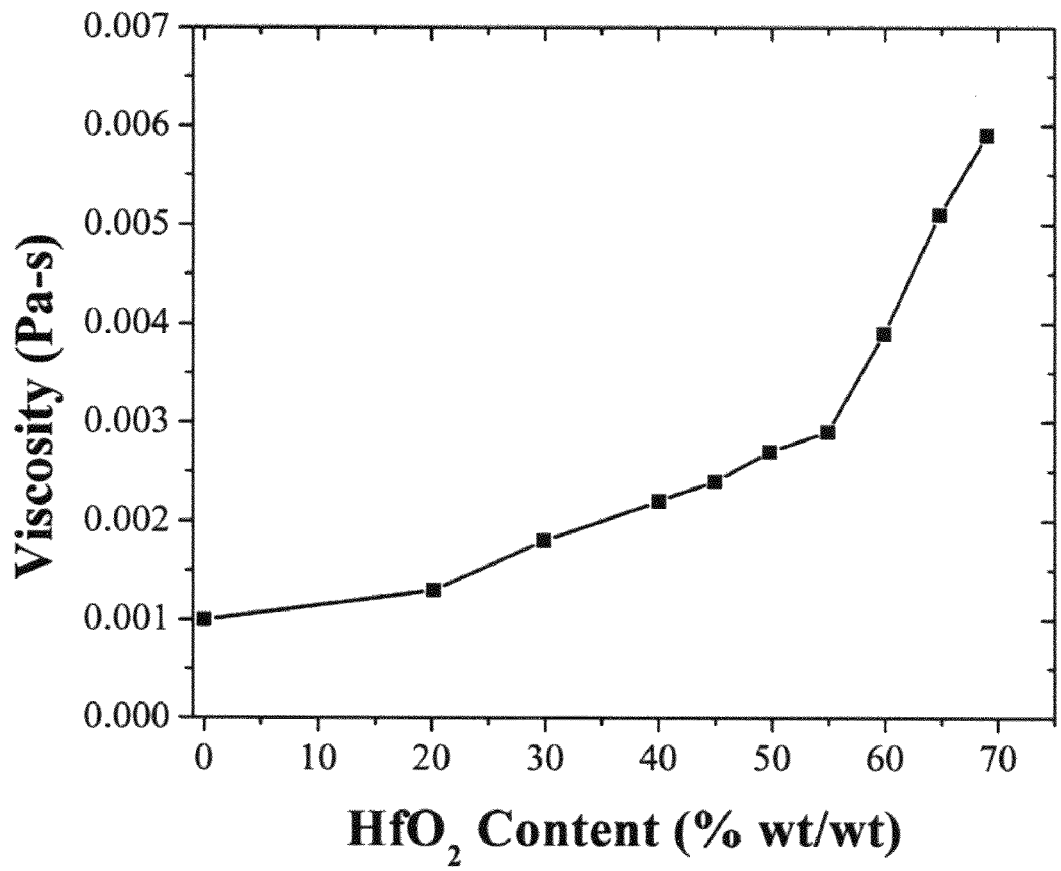
FIG. 7 shows the relative viscosity of $HfO_2$ suspensions as a function of filler concentration.

The rheological properties of fluids based on $HfOCl_2$ were also studied FIG. 7. The viscosity of the suspensions increases with higher loadings of nanoparticles, especially after 55% w/w loading, where a sharper increase is observed. At the highest loading of 69% w/w the viscosity is 6 times that of water. The results show that even at high loadings the viscosity is within the limits that allow the fluid to be applied in immersion lithography.

In certain embodiments, fluids containing hafnium oxide nanoparticles dispersed in water may be used in 193 immersion lithography. Two different precursors based on $HfOCl_2$ and hafnium isopropoxide were used. The first precursor based on $HfOCl_2$ yields hafnium clusters around 1.0 nm in diameter as measured by dynamic light scattering. Hafnium loadings of 68% wt/wt were achieved giving a refractive index of 1.434 at 589 nm. The extrapolated spectral index at 193 nm for this fluid was estimated to be 1.590. The viscosity of the fluid at the highest loading was 6 times the viscosity of water. A second precursor based on hydrolysis and condensation of hafnium isopropoxide in the presence of acetic acid results in acetate stabilized nanoparticles with a diameter between 1.0 nm and 2.0 nm. These particles were dispersed in water at 80% wt/wt giving a refractive index of 1.462 at 589 nm. The refractive index for a fluid containing 65% wt/wt nanoparticles was 1.431 at 589 nm and was estimated to be 1.568 at 193 nm. The small particle size, high solubility in water, high refractive index and low viscosity make these fluids useful for application in immersion lithography.

IV. HIGH INDEX PHOTORESIST CONTAINING METAL OXIDE NANOPARTICLES

In certain aspects, water dispersible metal oxides are used as a high index photoresist. In some examples, the water dispersible metal oxides were used as a positive resist and in other embodiments, the water dispersible metal oxides were used as a negative resist. Typically, to evaluate whether or not the metal oxide nanoparticles could be used as a photoresist, a film was created on a bare silicon wafer. In some examples, the film was created by spin coating.

In specific embodiments, water dispersible $HfO_2$ nanoparticles were used as a high index photoresist. Various ligands were used in the ligand exchange reaction with $HfO_2$-acetate to generate miscible photoresist nanoparticles. The ligand exchange reaction proceeds because the acetic acid binds reversibly to the hafnium dioxide surface and can be displaced by a phosphonate or carboxylic group, which forms a stronger bond to the hafnium dioxide surface. These core-shell structure nanoparticles are well dissolved in PGMEA, which is the solvent for the 193 nm photoresist. Other solvents that can be used may include, but are not limited to ethyl lactate, super critical carbon dioxide, N-methylpyrrolidone, cyclohexanone, 2-ethoxy ethanol, 2-ethoxyethyl acetate, ethyl-3-ethoxy propionate, chlorobenzene, anisole, 3-methyl-3-methoxy butanol, diethyl succinate.

Various ligands were used in the ligand exchange with acetate ($HfO_2$-acetate). These ligands have at least one of the following functional groups: carboxylic acid, carboxylate, phosphoric acid, or some functional group that is derivative of carboxylic acid or phosphoric acid. Specific examples include, but are not limited to triethyl phosphonoacetate (Ligand 1), triethyl 3-phosphonopropionate (Ligand 2), diethyl (2-oxopropyl)phosphonate (Ligand 3), diethyl (2-oxobutyl)phosphonate (Ligand 4), triethyl 3-methyl-4-phosphono-2-butenoate (Ligand 5), diethyl allyl phosphate (Ligand 6), (−)-O,O'-di-pivaloyl-L-tartaric acid (Ligand 7), methacrylic acid (Ligand 8), (5)-(+)-tetrahydrofurfuryl-O, O'-diacetyl-(2R,3R)-hydrogen tartrate (Ligand 9). These ligands are shown here:

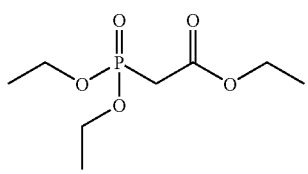

Triethyl phosphonoacetate
Ligand #1

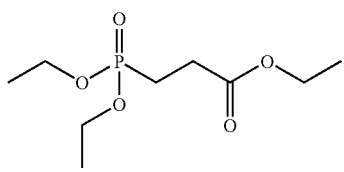

Triethyl 3-phosphonopropionate
Ligand #2

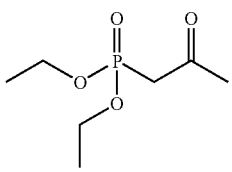

Diethyl (2-oxopropyl)phosphonate
Ligand #3

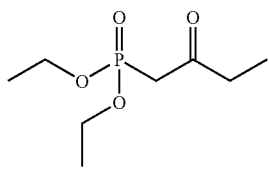

Diethyl (2-oxobutyl)phosphonate
Ligand #4

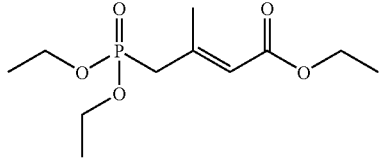

Triethyl 3-methyl-4-phosphono-2-butenoate
Ligand #5

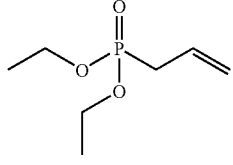

Diethyl allyl phosphate
Ligand #6

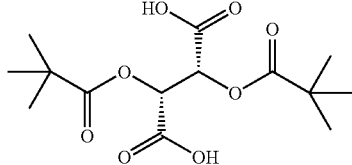

(-)-O,O'-Di-pivaloyl-L-tartaric acid
Ligand #7

-continued

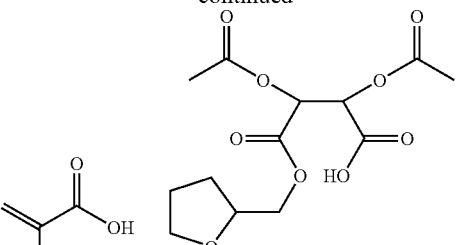

Methacrylic acid
Ligand #8

(s)-(+)-tetrahydrofurfuryl-O,O'-diacetyl-(2R,3R)-hydrogentartrate
Ligand #9

The FTIR spectrum and size distribution of the $HfO_2$-acetate are shown in FIG. 1 and FIG. 2. The typical stretching peaks of C=O and C—O⁻ from acetate are observed at 1710 and 1450 $cm^{-1}$. The O—H broad peak around 3300 $cm^{-1}$ demonstrated the $HfO_2$-acetate is strongly hydrated even after drying. Dynamic light scattering (DLS) shows that the average diameter of $HfO_2$-acetate is 1.3 nm, but after drying and re-suspending in water, the size increases to about 2.0 nm. This size is small enough to prevent $HfO_2$-aceatate induced light scattering, if the nanoparticles are uniformly dispersed in the photoresist matrix.

Figure 18:
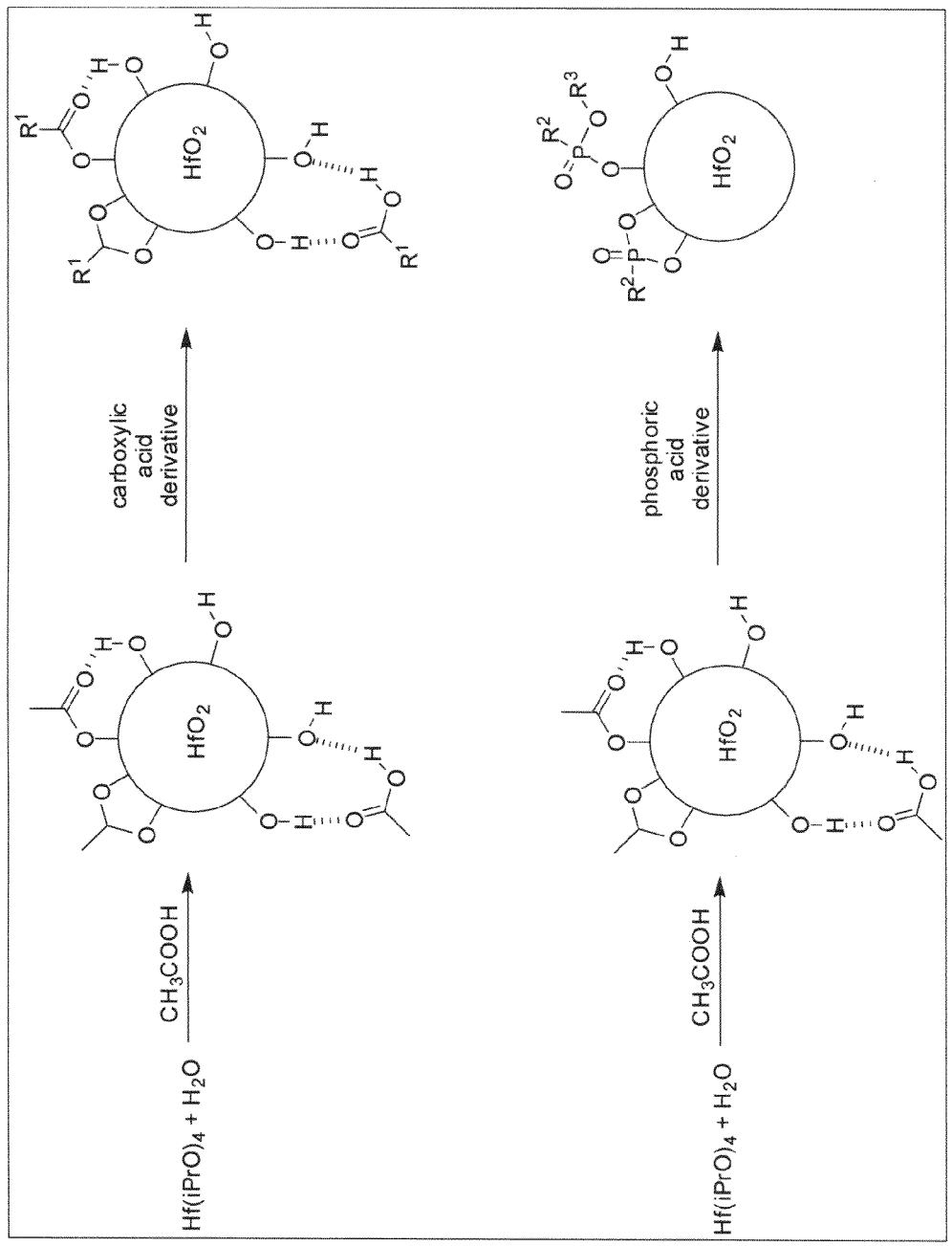
FIG. 18 shows a non-limiting schematic representation for a ligand exchange reaction.
Figure 19:
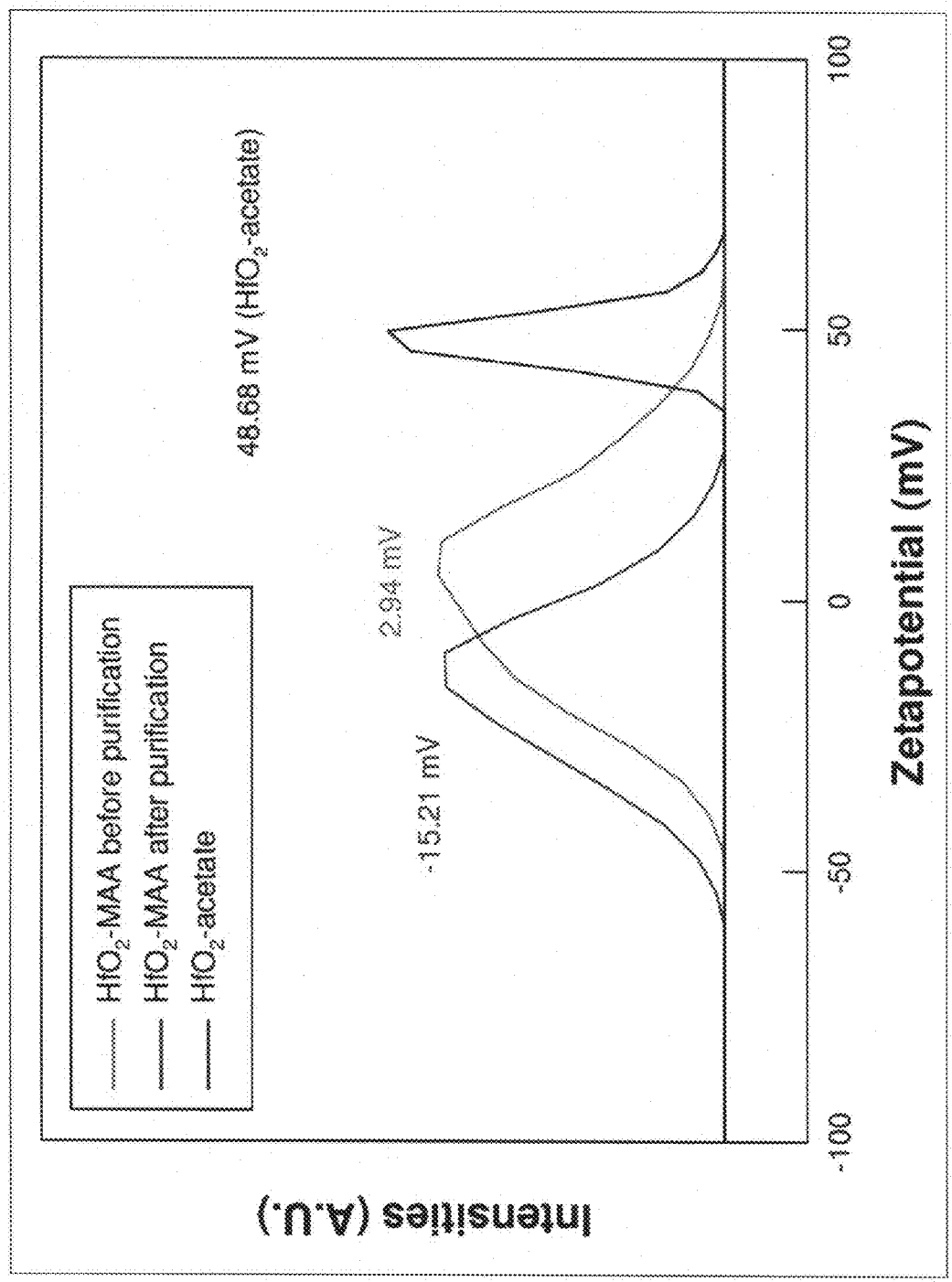
FIG. 19 shows (from right to left) zetapotential measurements for $HfO_2$-methylmethacrylate ($HfO_2$-MAA) after purification, $HfO_2$-methylmethacrylate before purification, and $HfO_2$-acetate.
Figure 20:
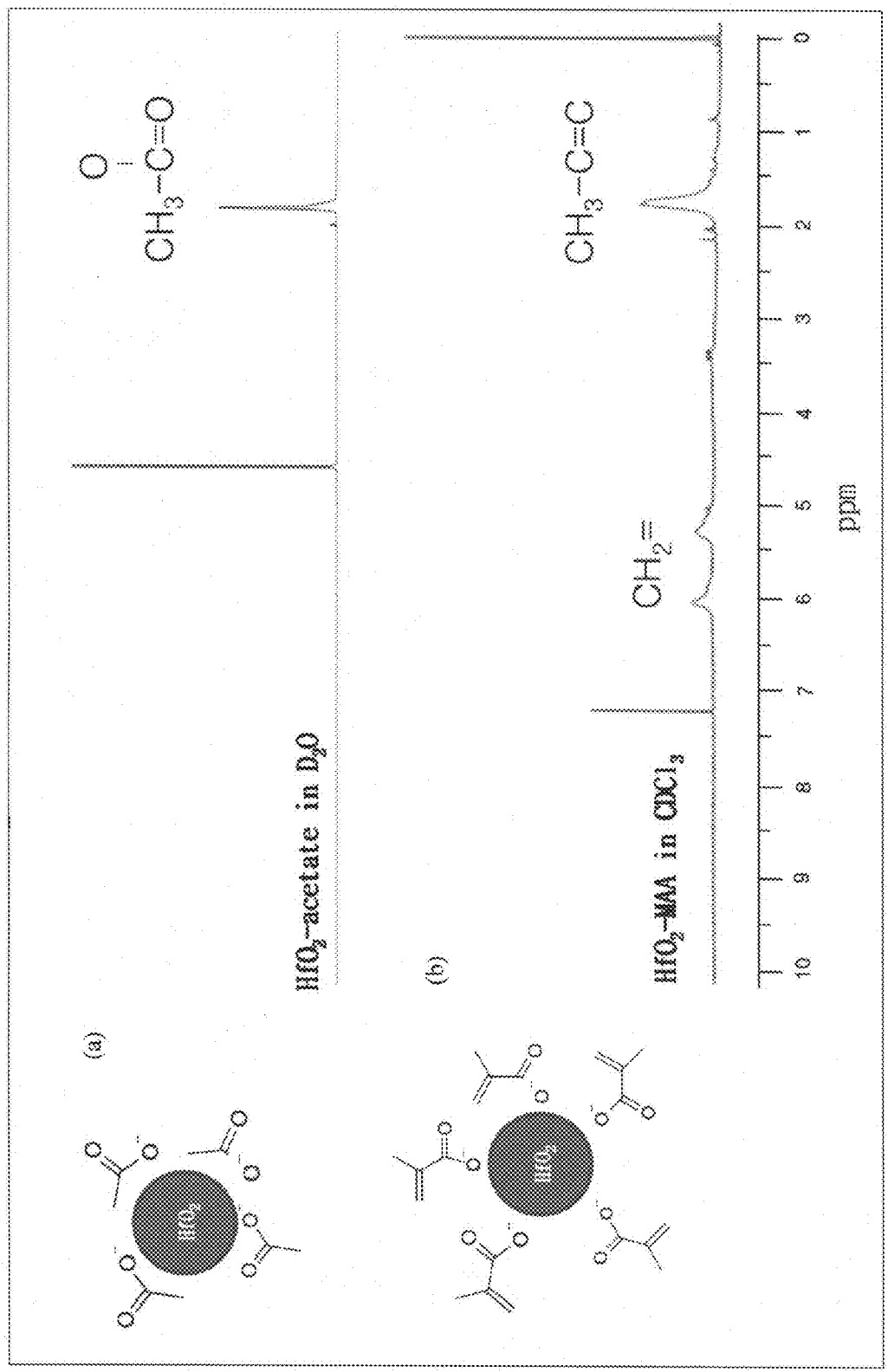
Figure 21:
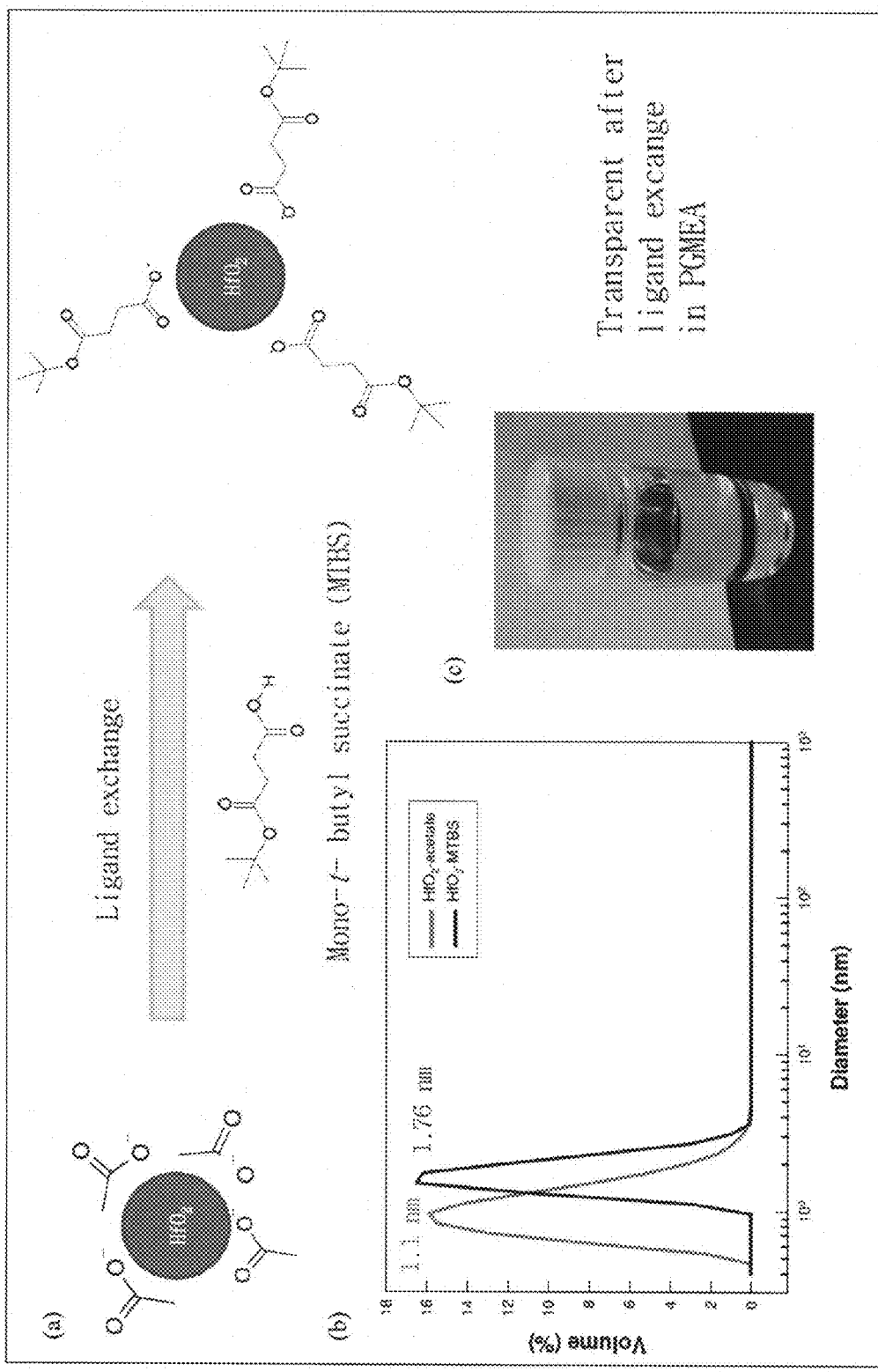
Figure 22:
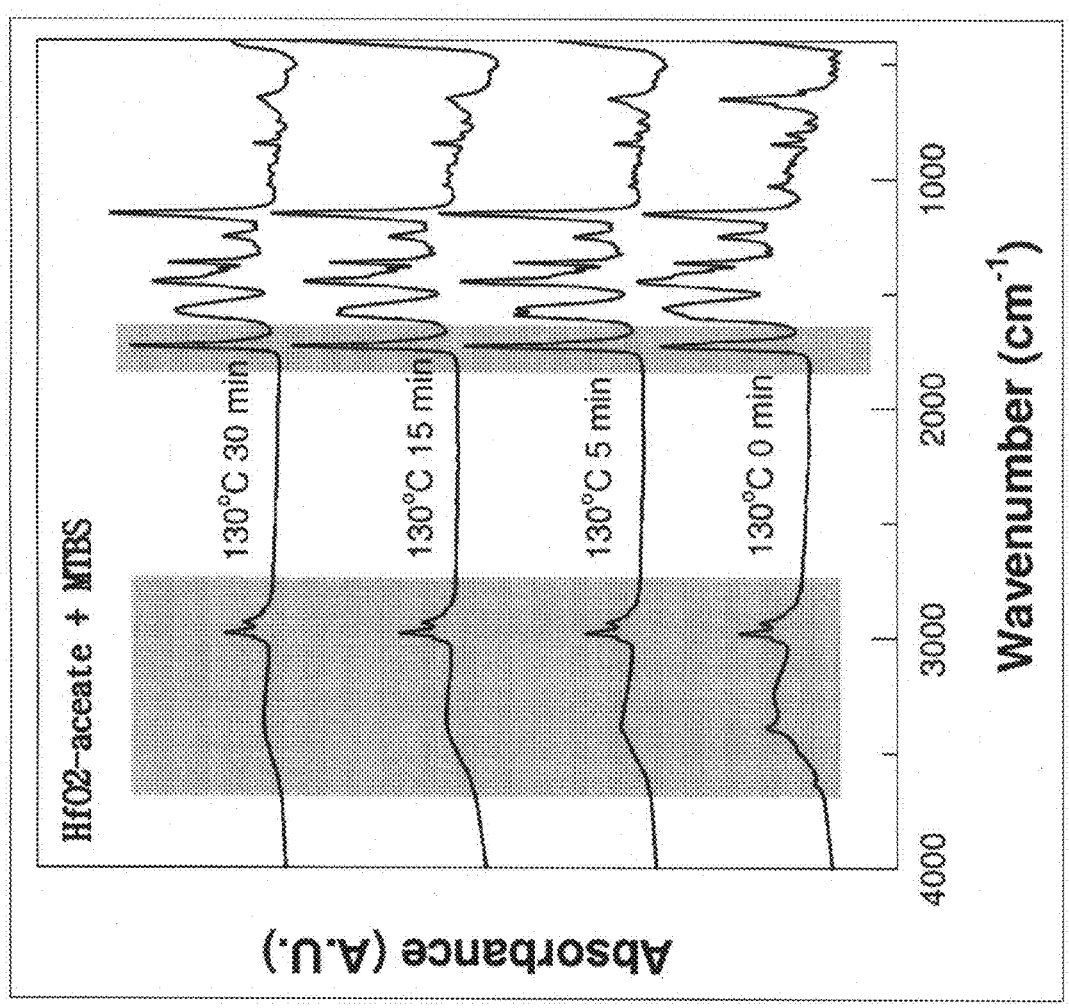
FIG. 22 shows stability of tert-butyl group during the ligand exchange reaction described in FIG. 21A at 0, 5, 15 and 30 minutes, respectively. The broad absorbances between 2800 to 3600 $cm^{-1}$ consistent with carboxylic acid groups decreased over time. However, the carbonyl peak at 1730 $cm^{-1}$ does not change or shift. A shift to 1700 $cm^{-1}$ would have been consistent with deprotection of the ester (cleavage of the tert-butyl group); however, this wasn't observed.
Figure 23:
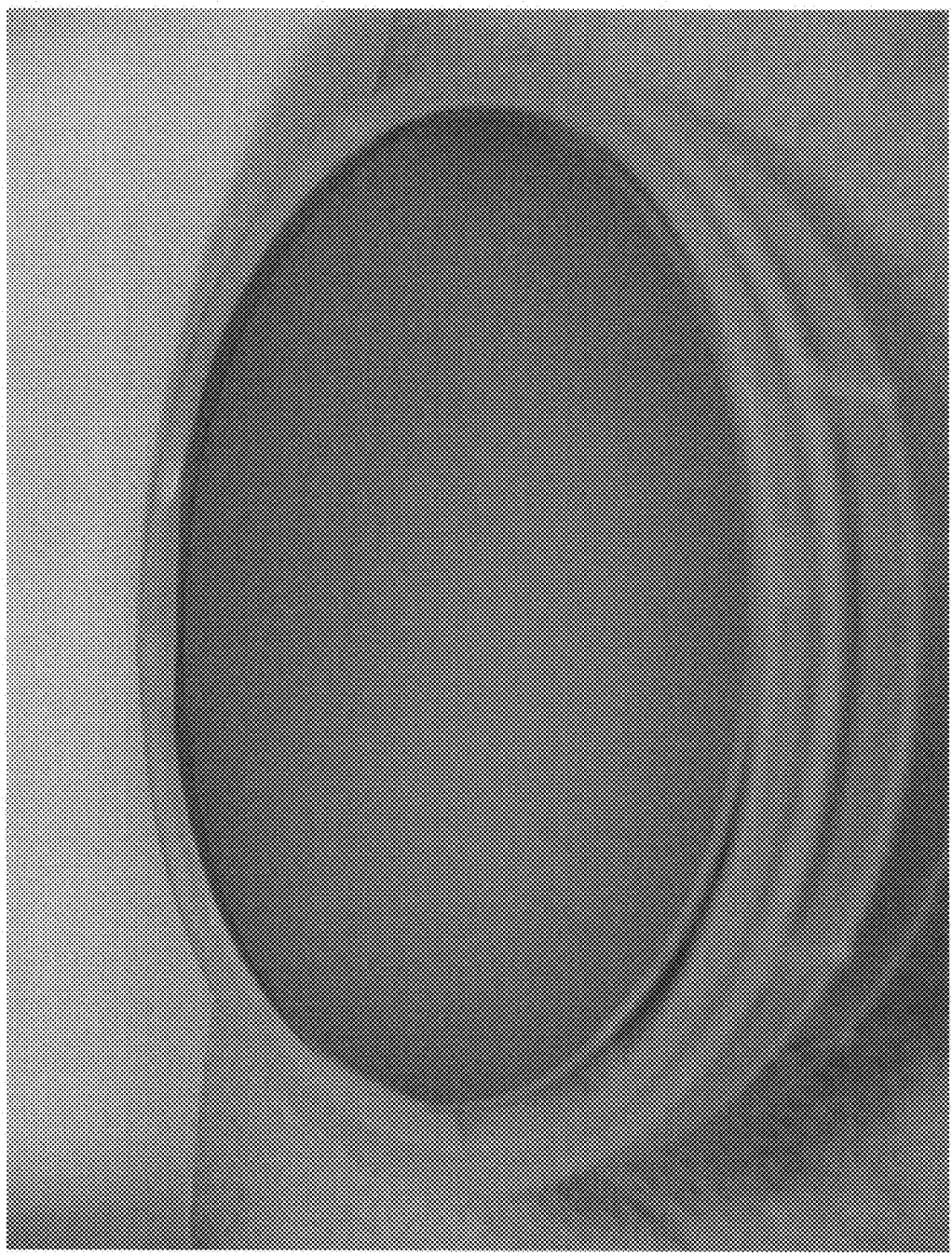
FIG. 23 shows a spin coated film based on $HfO_2$-MAA nanoparticles. There are no apparent defects, such as pinholes.
Figure 24:
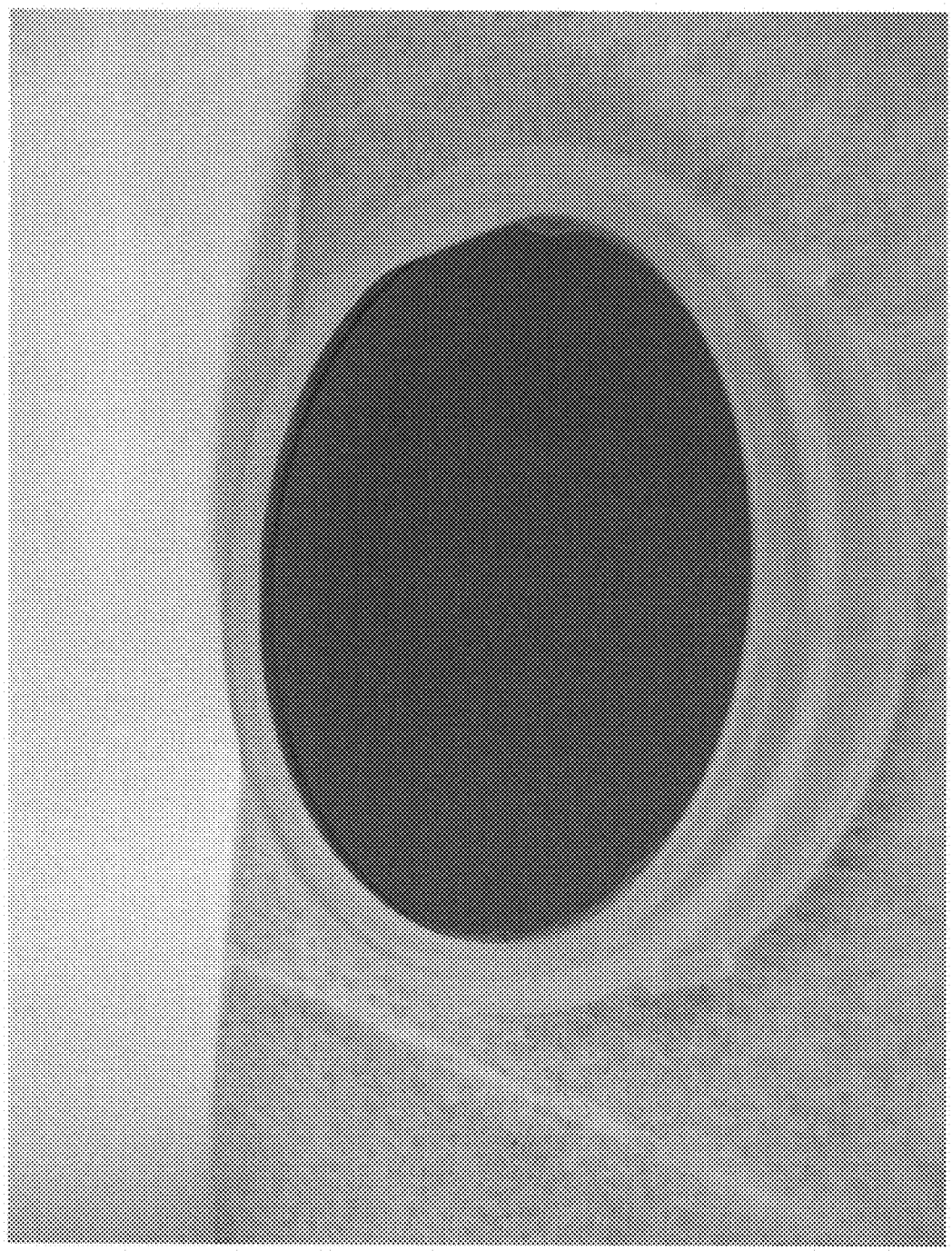
FIG. 24 shows a spin coated film based on $HfO_2$-MTBS nanoparticles. There are no apparent defects, such as pinholes.
Figure 25:
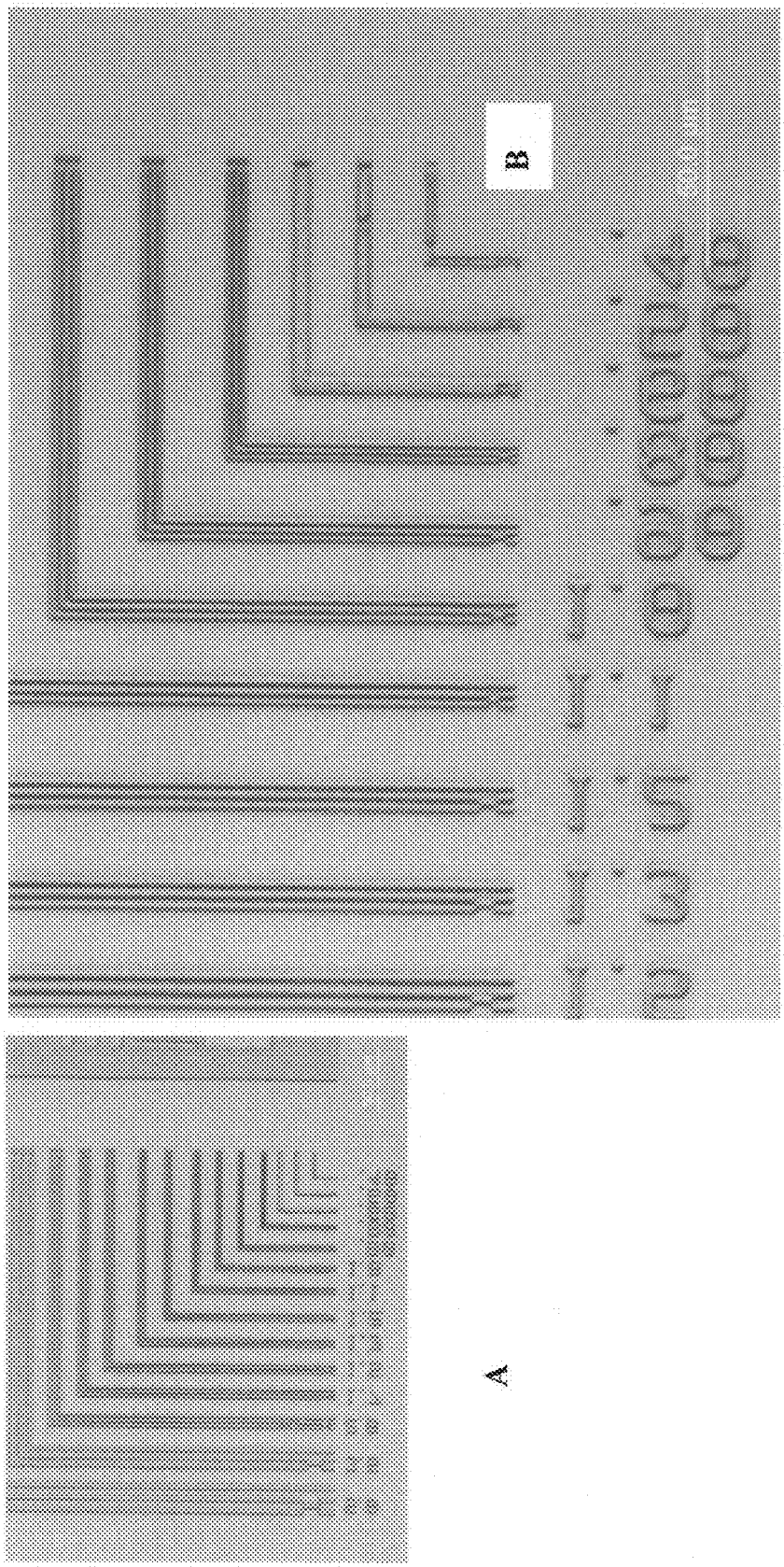
FIGS. 25A & B show an optical microscope image (FIG. 25A) and expanded region (FIG. 25B) of negative tone pattern of $HfO_2$-MAA after UV exposure (254 nm).
Figure 26:
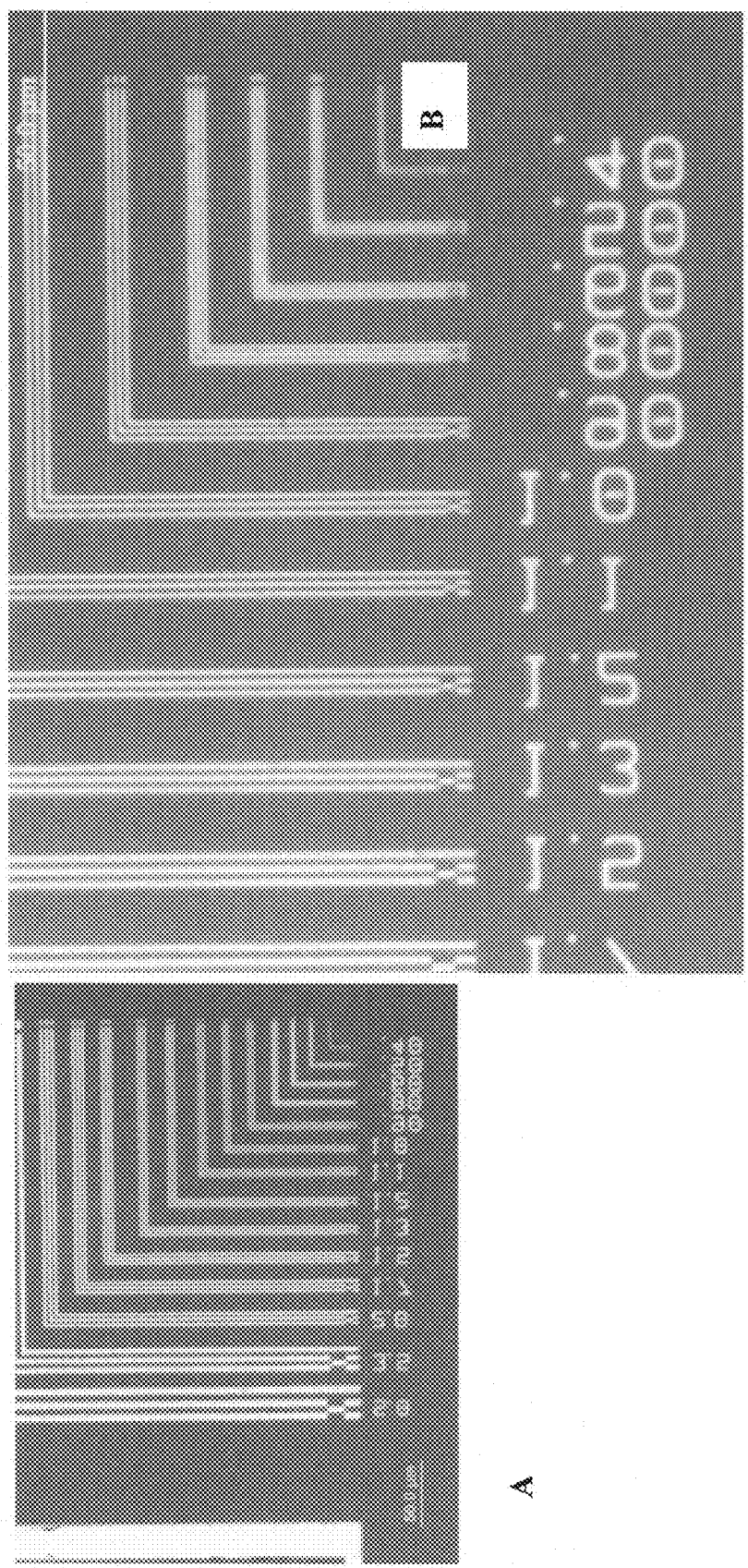
FIGS. 26A & B show an optical microscope image (FIG. 26A) and expanded region (FIG. 26B) of positive tone pattern of $HfO_2$-MAA after UV exposure (254 nm).
Figure 27:
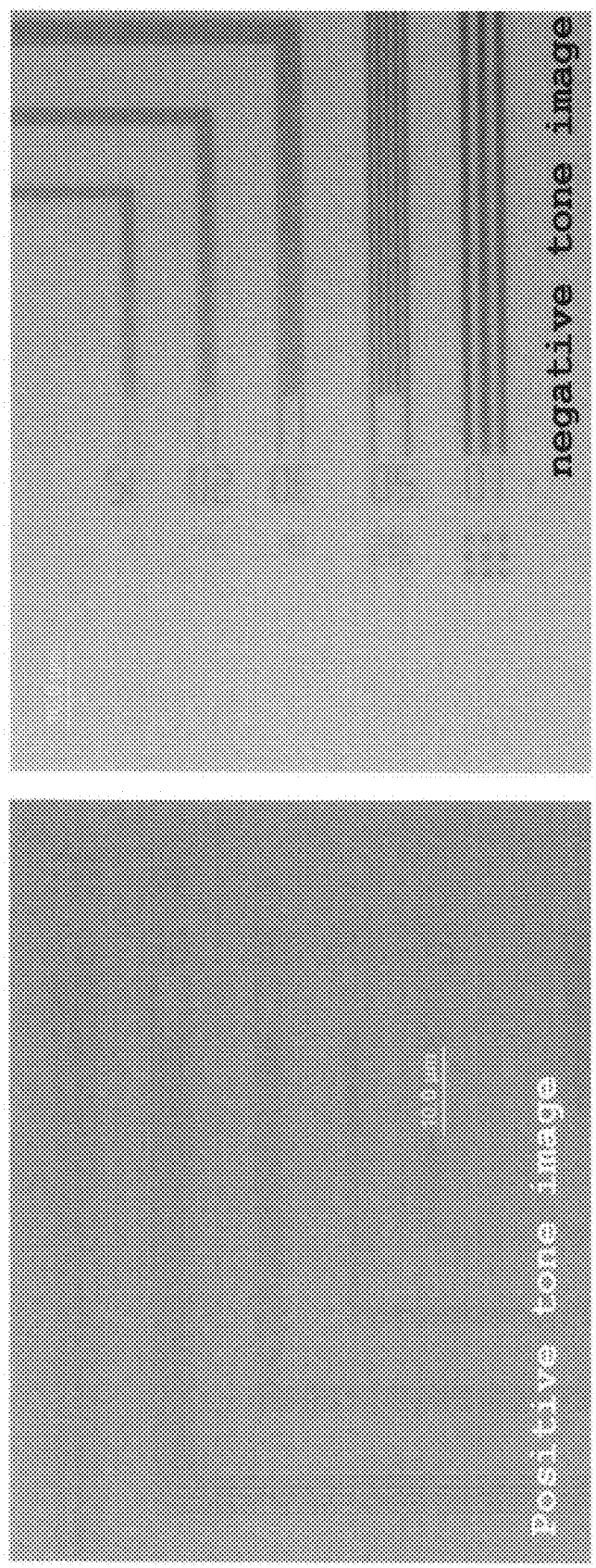
FIGS. 27A & B show of optical microscope images of positive tone (FIG. 27A) and negative tone (FIG. 27B) pattern of $HfO_2$-MAA after e-beam lithography. For FIG. 27A: dose: 240 $\mu C/cm^2$; PEB: 130° C. 5 min; Developing condition: in water 5 min. For FIG. 27B: dose: 213 $\mu C/cm^2$; Developing condition: in IPA 2 min.
Figure 28:
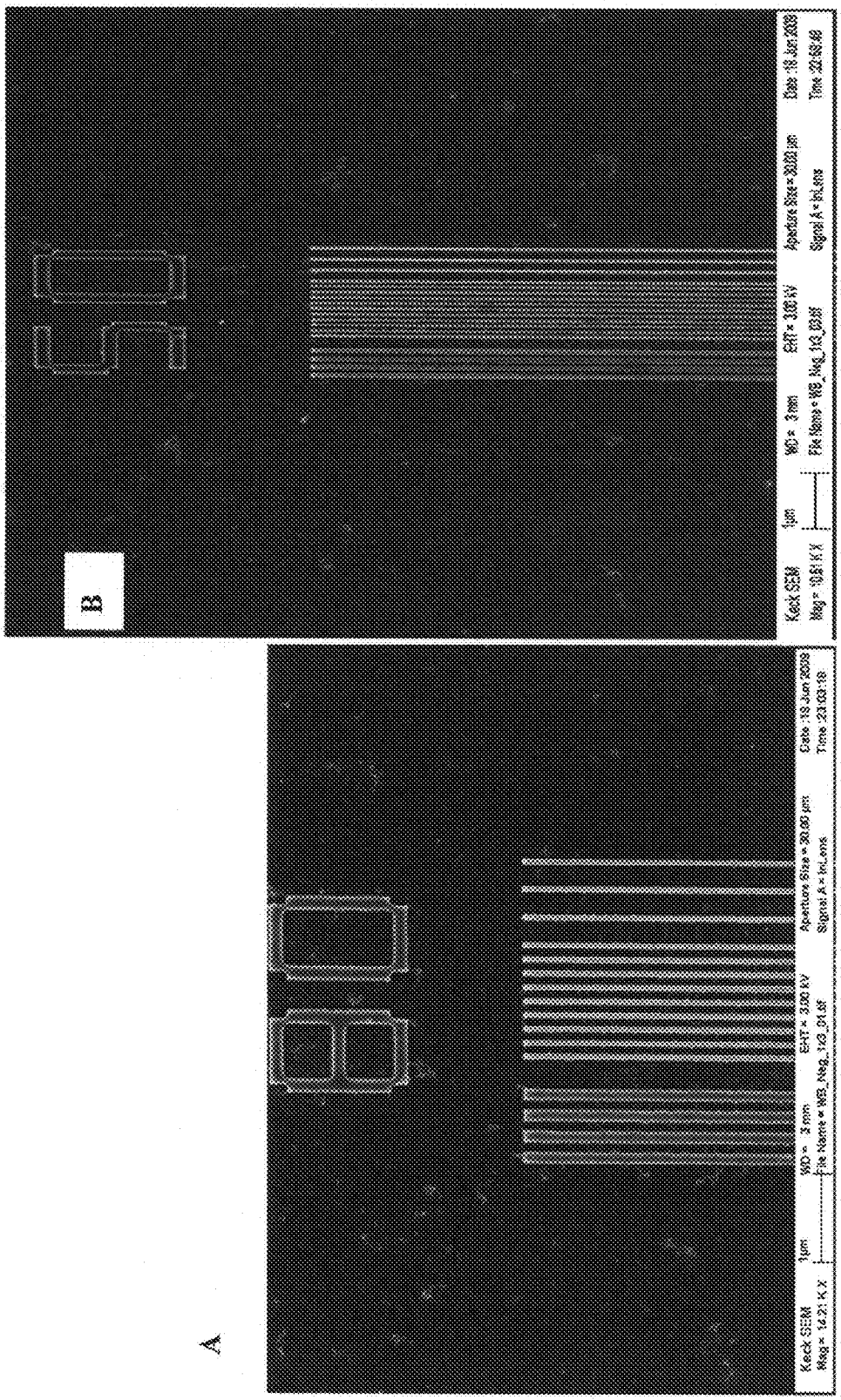
FIGS. 28A & B show SEM images of negative tone patterns of $HfO_2$-MAA after e-beam lithography. Dose: 213 $\mu C/cm^2$; Developing condition: in IPA 2 min.

The phosphonate ligands were selected for the ligand exchange reaction because phosphonate has excellent binding properties with Hafnium oxide, and the carboxylic acid derivatives were chosen because carboxylic acid like acetic acid increases the solubility of $HfO_2$ nanoparticles up to 70 wt % in water. The basic concept is that if the end groups of phosphonate-terminated or carboxyl acid-terminated ligands are modified with more photoresist-miscible groups, the $HfO_2$ nanoparticles may be homogeneously mixed with the photoresist. Because propylene glycol monomethyl ether acetate (PGMEA) drives the bulk of the photoresist solvent, the preparation of PGMEA-like ligands which have phosphonate or carboxylic end groups were targeted. Without being bound by theory, a schematic representation for a ligand exchange reaction is shown in FIG. 18.

Figure 8:
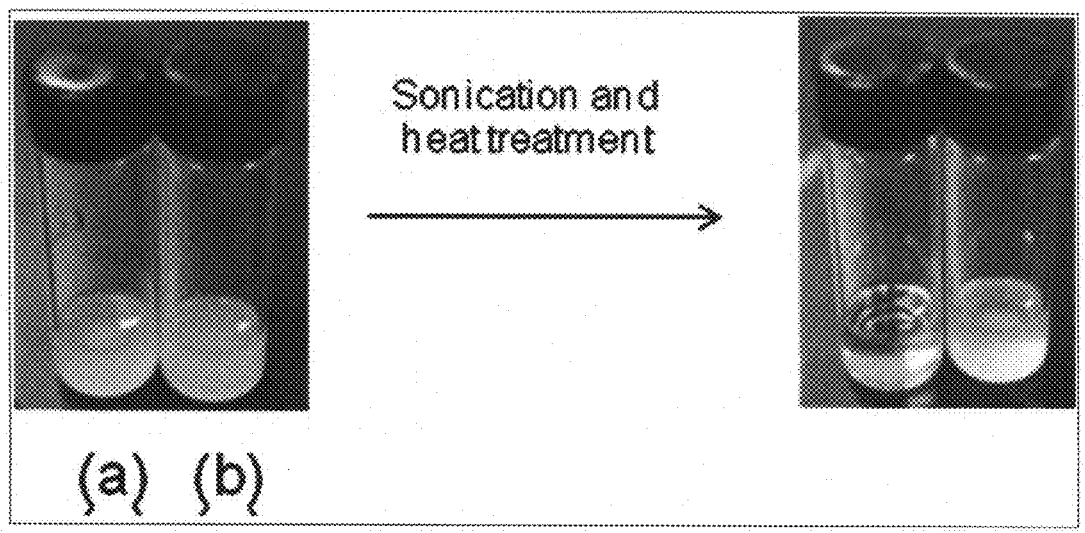
FIG. 8 shows the comparisons of solubility of the $HfO_2$-acetate in PGMEA with and without the ligand (Ligand 2) before and after sonication and heat-treatment.

All ligands were found to be soluble in PGMEA after sonication and heat-treatment. Since $HfO_2$-acetate is insoluble in PGMEA, some free ligands were added into the $HfO_2$-acetate/PGMEA solution. Comparisons of the solubility of the $HfO_2$-acetate in PGMEA with and without the ligand after sonication and heat-treatment is shown in FIG. 8. In FIG. 8, the left picture was taken before sonication and heat-treatment and the right picture was taken after sonication and heat-treatment. Vial (a) contains $HfO_2$ (10 mg), Ligand 2 (1 mg) in PGMEA (1 ml) and vial (b) contains $HfO_2$ (10 mg) in PGMEA (1 ml). Only a small amount of the free ligand is required to make the solution transparent, demonstrating that the ligand exchange reaction occurred successfully.

Figure 9:
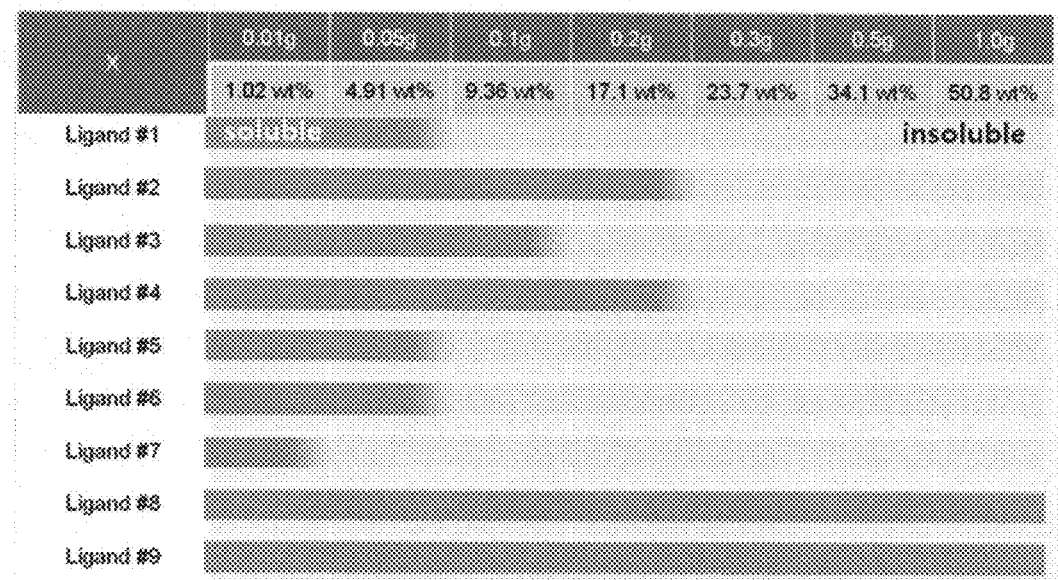
FIG. 9 shows the results of the solubility test of $HfO_2$/ligands in PGMEA. The ligand 0.5 grams and PGMEA (1 ml) are used as standard solution and $HfO_2$-acetate from 0.01 to 1.0 g was dissolved into the solution.

The solubility test results from various ligands/$HfO_2$-aceatate in PGMEA are shown in FIG. 9. Ligand 8 (methacrylic acid)/$HfO_2$ and Ligand 9 (tetra-hydrofurfuryl-diacetyl-hydrogentartrate)/$HfO_2$ show the best solubility with over 50 wt % of $HfO_2$ in PGMEA. Ligand 9 contains an internal PGMEA structure. Thus, this particular $HfO_2$-ligand combination dissolves well in PGMEA. Methacrylic acid (MMA) is compatible with PGMEA because acrylate derivatives are well known photoresist component and the MMA size is small enough that it can be incorporated onto the $HfO_2$ surface. Ligands 1 to 4 are similar structures, but show different solubility in PGMEA. There is no consistent tendency for these results. The target loading of $HfO_2$ in PGMEA should fall below 5 wt % with a target refractive index of 1.80. When the volume fraction of $HfO_2$ nanoparticles needed in photoresist is calculated using the Lorentz-Lorenz equation, the Vs is 0.13 which is based upon the assumption that the $n_m$ of the resist and $n_s$ of $HfO_2$ are 1.7 and 2.9, respectively.

In some embodiments, the photoresist concentration in PGMEA is about 5 to 20%, 5 to 15%, 5 to 10%, 10 to 20%, 15 to 20%, 10 to 15% by weight. The percentage by weight was calculated according to the resist structure and $T_g$. Thus, the target loading of $HfO_2$ in PGMEA is only about 0.8 to 2.6%, 0.8 to 2.2%, 0.8 to 1.8%, 0.8 to 1.4%, 0.8 to 1.0%, 1.0 to 2.6%, 1.4 to 2.6%, 1.8 to 2.6%, 2.2 to 2.6%, 2.6% or less, 2.4% or less, 2.0% or less, 1.6% or less, or 1.2% or less by weight. In some embodiments, the $HfO_2$ is not pure and the $HfO_2$-ligand combination is pure. In other embodiments, the $HfO_2$ is pure and the $HfO_2$-ligand combination is not pure. In alternate embodiments, both the $HfO_2$ is pure and the $HfO_2$-ligand combination is pure. In yet another embodiment, both the $HfO_2$ is not pure and the $HfO_2$-ligand combination is not pure. In some example, it is assumed that a maximum of 50% by weight of the ligands are incorporated onto the surface of $HfO_2$. However, to prepare a high index nanocomposite photoresist requires that 1.6 to 5.2% of the $HfO_2$-ligand by weight is soluble in PGMEA. All of $HfO_2$-ligands core-shell nanoparticles show minimum of 4.91% by weight solubility in PGMEA. This means that all of the $HfO_2$-ligands (Ligand 1 through Ligand 9) can be used to prepare the nanocomposite photoresist.

Figure 10:
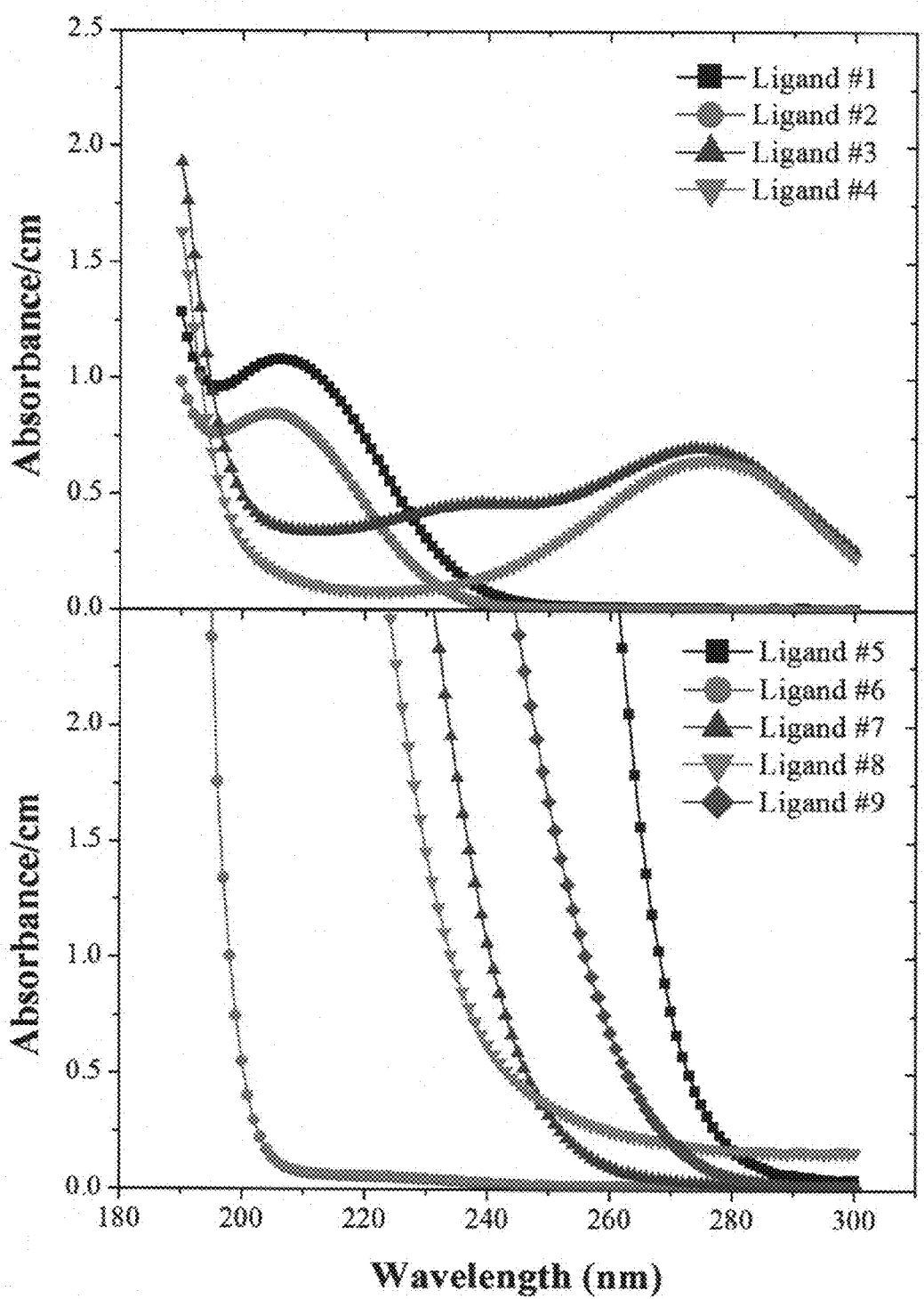
FIG. 10 shows the UV absorbance of various ligands in deionized water. The concentration is 20 μmol in water.

To investigate the UV absorption of ligand at around 193 nm, the UV-VIS spectra was measured and is shown in FIG. 10. All these tests were performed using DEIONIZED water as solvent, because even the distilled PMGEA absorbs a large quantity of UV at 193 nm. The UV absorption of Ligand 5, Ligand 6, Ligand 7, Ligand 8 and Ligand 9 shows the maximum plateau all over the UV range. This is due to the double bonds present in Ligand 5, Ligand 6 and Ligand 8 and the carboxylic acid present in Ligand 7, Ligand 8 and Ligand 9. Ligand 2 was selected for further spin-coating test because this ligand is structurally benign in that it does not absorb significant amounts of UV and it has a relatively high solubility in PGMEA.

The ligand concentration optimization test was done for the further spin-coating on a silicon wafer. Because an excess of ligand (0.5 g in 1 ml PGMEA) was used in the solubility test, the ligand concentration is optimized to reduce the ligand concentration. In some embodiments, the optimized ligand concentration decreases the refractive index of the system as a whole. Incorporation of the Ligand 2 (2.6 mg; 0.25% by weight) into $HfO_2$-aceatate 52 mg (5% by weight) shows good solubility in PGMEA (10.4 g). The $HfO_2$/ligand ratio of 20 to1 was chosen for the further spin-coating test. The spin coating was conducted on the bare silicon wafer at 200 rpm for three seconds and at an additional 2000 rpm for 60 seconds. After the post applied bake (PAB), the film shows good uniformity and no defects like pinhole.

Figure 11:
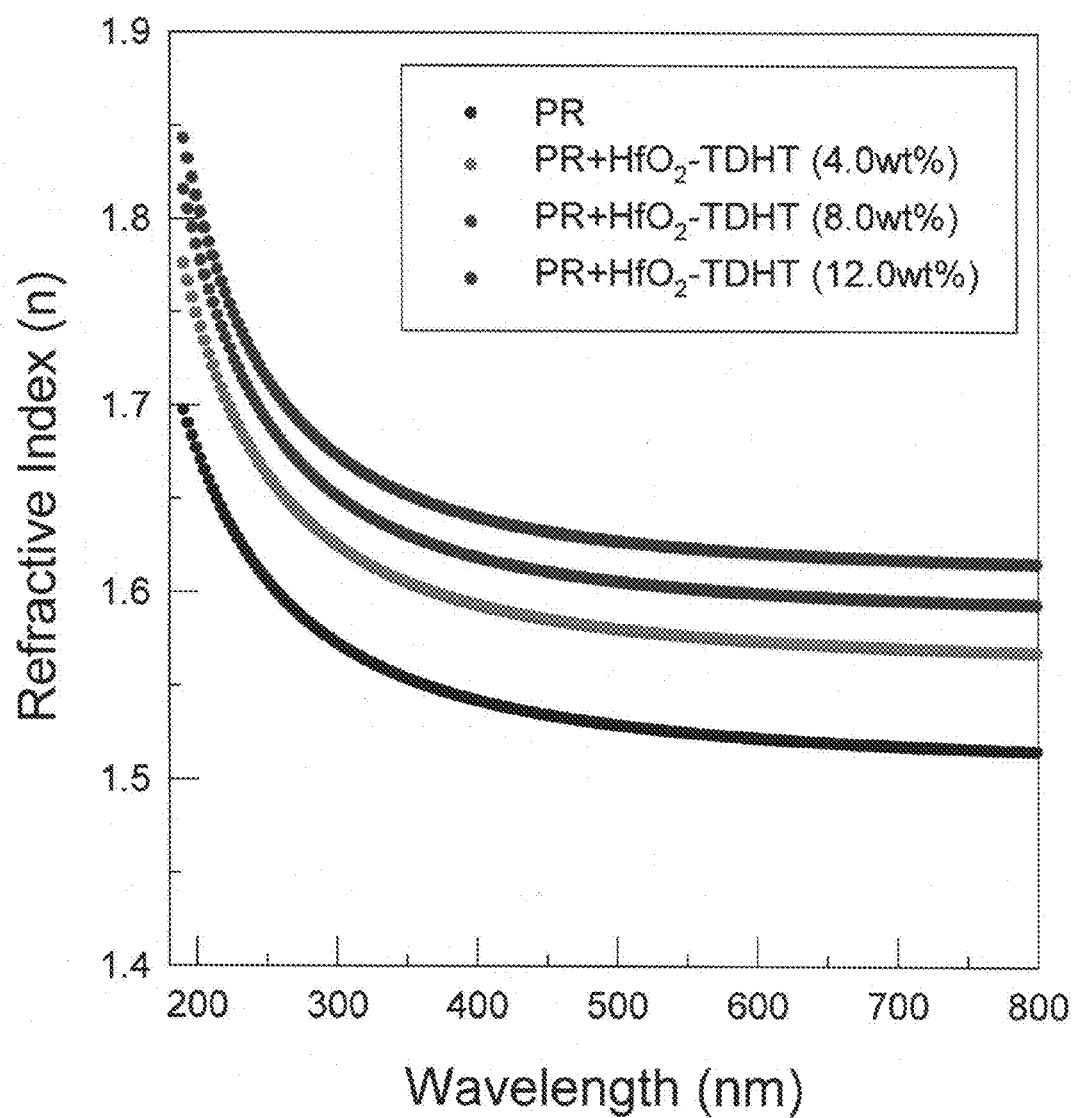
FIG. 11 shows the refractive index of the spin coated film of $HfO_2$/ligand 2 on a silicon wafer; PR is P(MAdMA-co-GBLMA); TDHTis ligand 2.
Figure 12:
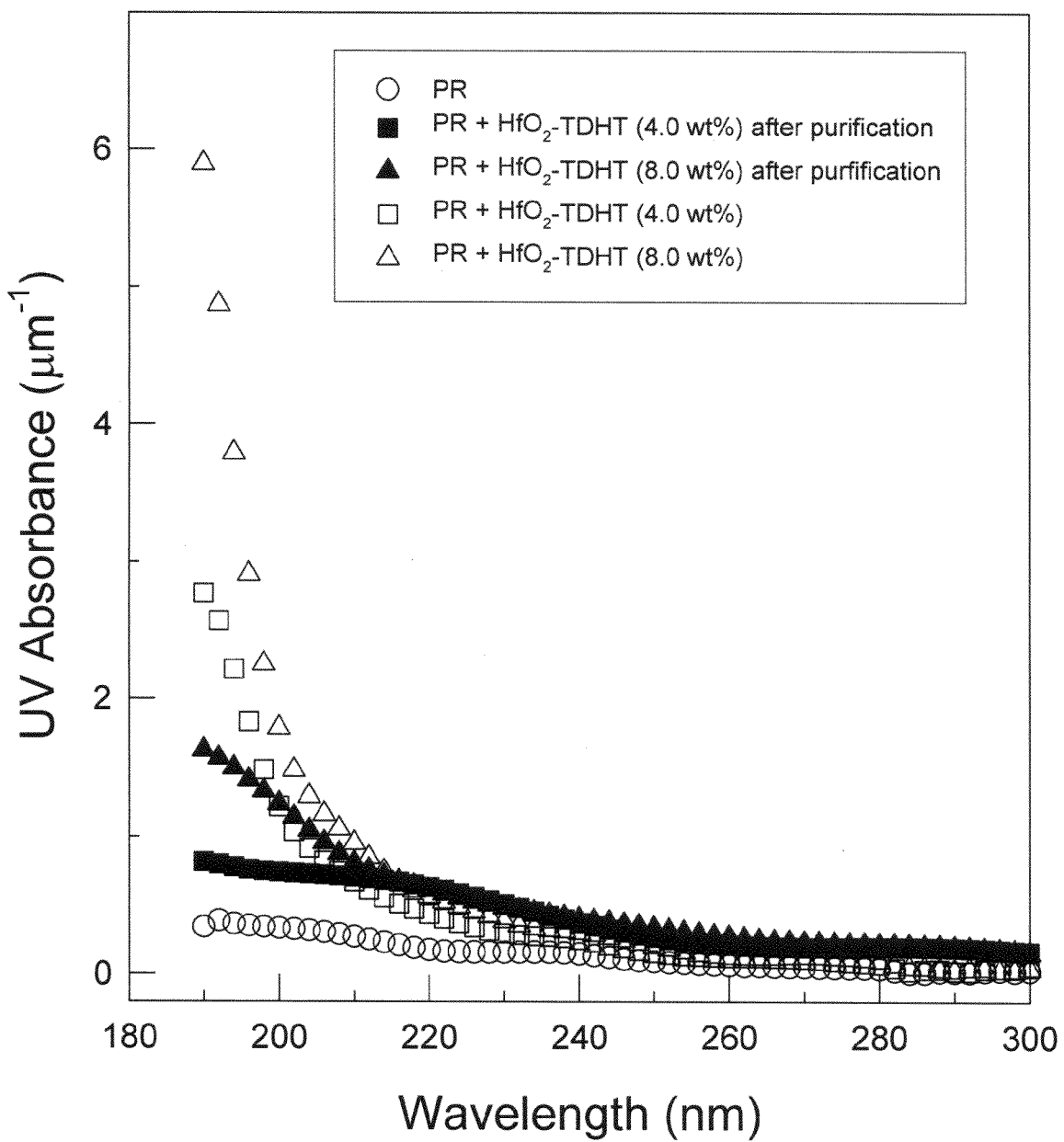
FIG. 12 shows the UV absorbance of $HfO_2$/Ligand 2 on a silicon wafer; PR is P(MAdMA-co-GBLMA); TDHT is ligand 2.
Figure 13:
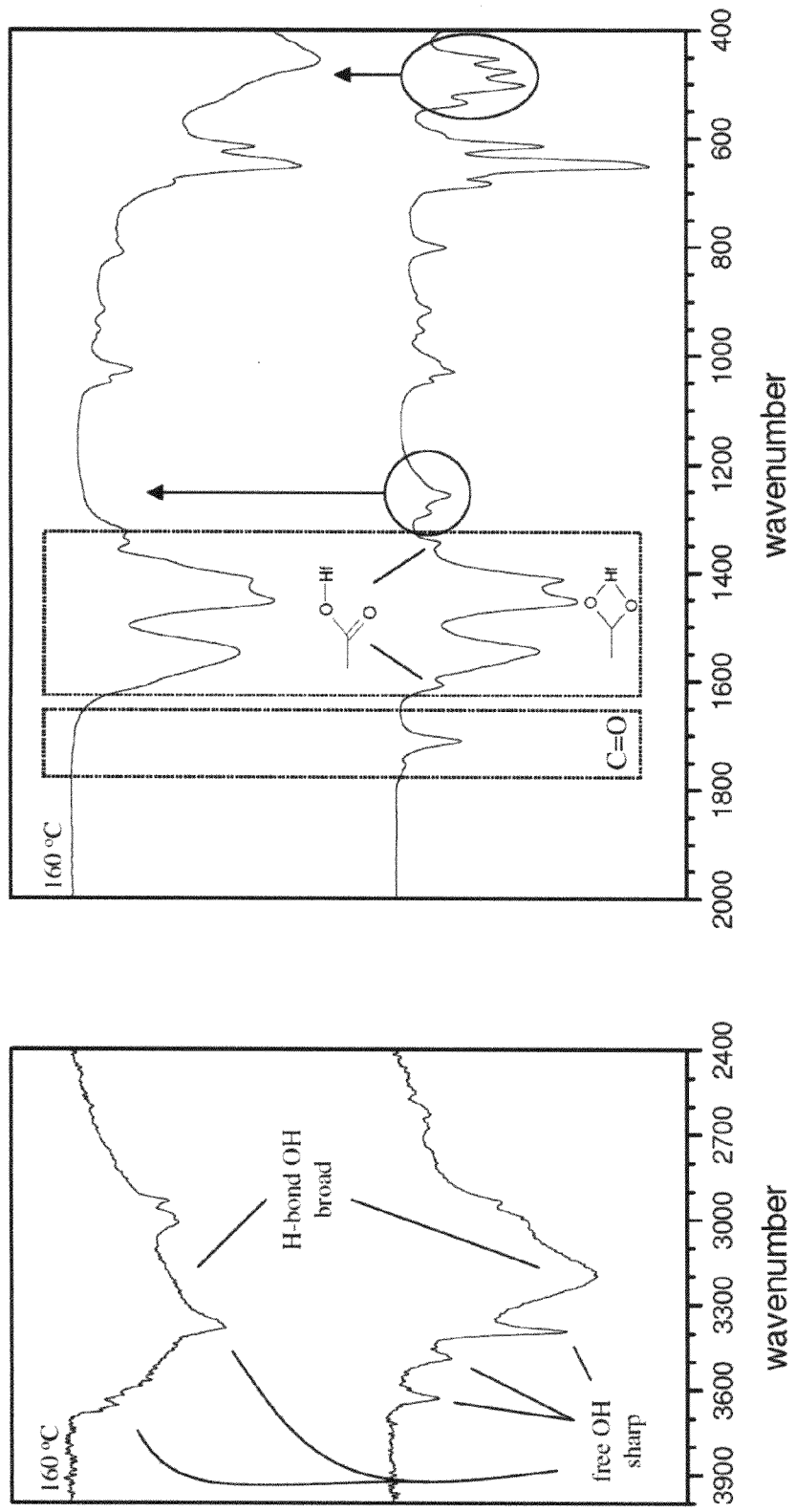
FIG. 13 shows the IR spectrum of $HfO_2$ acetate dispersed in acetone and then air dried at 160° C. Initially (bottom spectrum) several carboxyl (mono-, bidentate, free acetic acid) and hydroxyl groups (C—OH, Hf—OH, Hf—OH—Hf) are visible. After 3h at 160° C. free acetic acid is removed and the free hydroxyls are significantly reduced.
Figure 16:
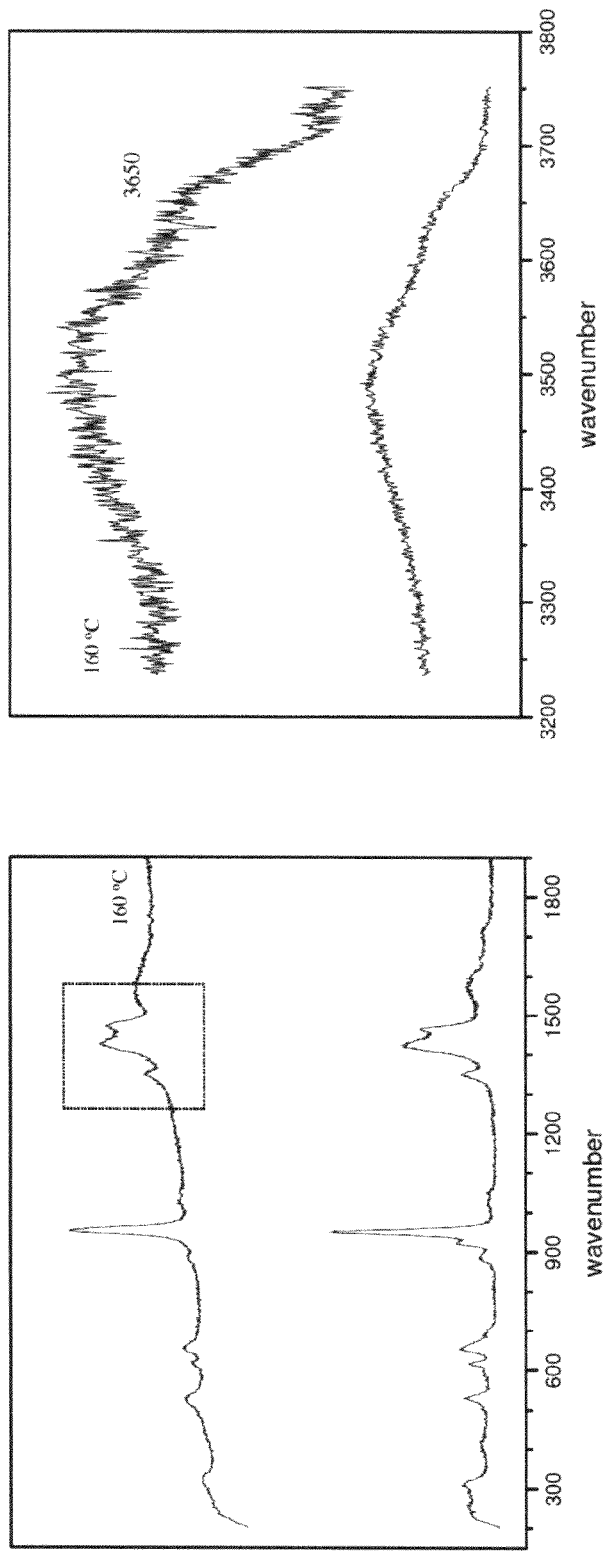
FIG. 16 shows the Raman spectrum of $HfO_2$ acetate dissolved in water and then vacuum dried at 50° C. The spectrum is slightly modified after 3h at 160° C. (top spectrum). In the hydroxyl region a shoulder at 3650 cm-1 is observed.
Figure 17:
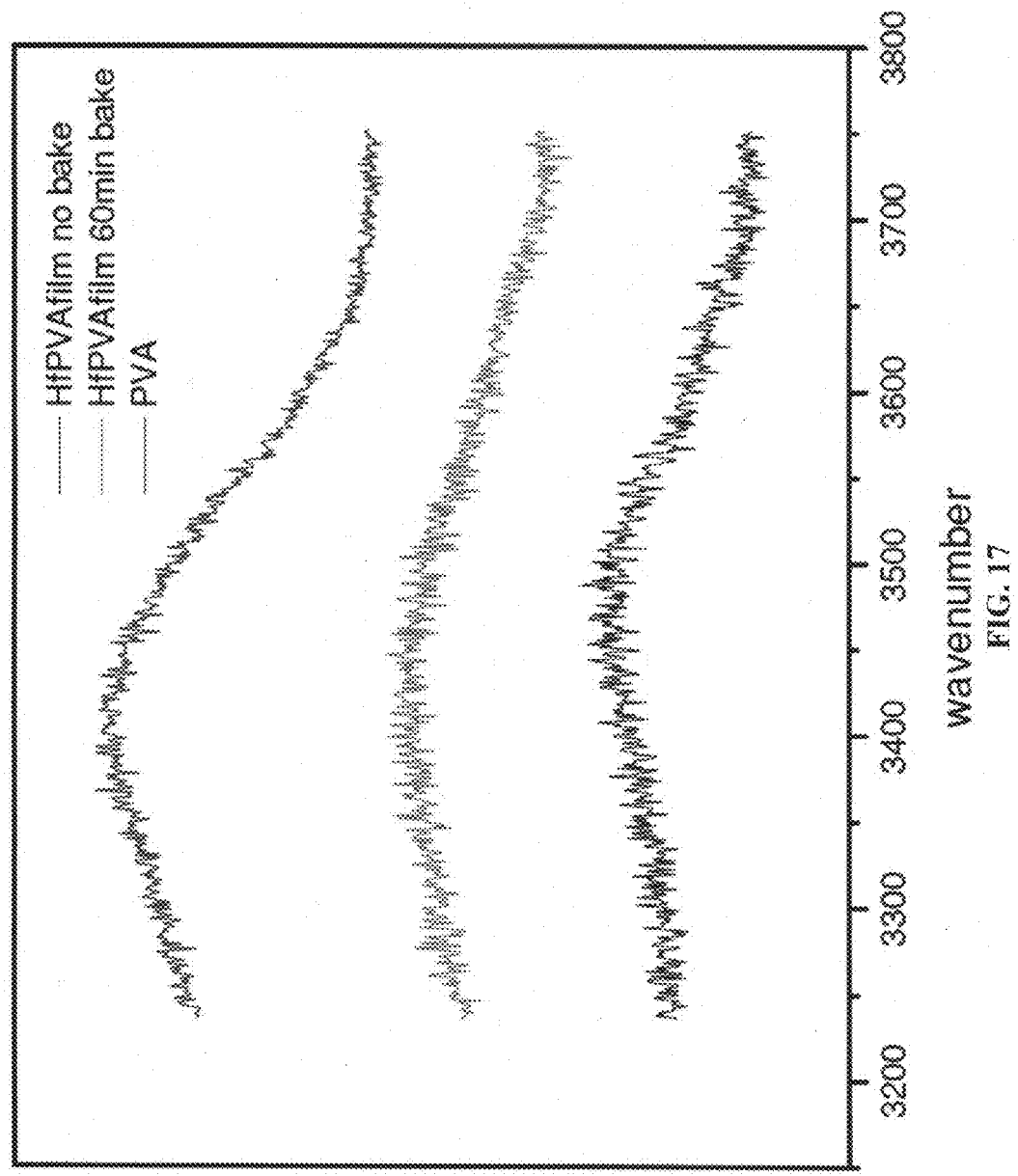
FIG. 17 shows the Raman spectrum of a $HfO_2$ acetate PVA film. The bottom spectrum shows $HfO_2$ acetate PVA (polyvinyl alcohol) film not baked. The middle spectrum shows $HfO_2$ acetate PVA film baked for 60 minutes at 130° C. The top spectrum is just PVA. Both the acetate (1300 $cm^{-1}$-1500 $cm^{-1}$) and hydroxyl (~3500 $cm^{-1}$) peaks decrease after baking for 60 minutes at 130° C.

FIG. 11 and FIG. 12 show the refractive index and the UV absorbance of the spin-coated film, respectively. With only the small amount of $HfO_2$/ligand (0.7 wt %), the refractive index increases from 1.7 to 1.73. The UV absorbance also increases from .0.45 $cm^{-1}$ to 0.60 $cm^{-1}$ with the incorporation of the metal oxide nanoparticle due to the high absorption of $HfO_2$-aceatate. The target refractive index is 1.8 with a maximum UV absorbance below .0.15 $cm^{-1}$. Since the solubility of the $HfO_2$/ligand is over 17% by weight. By incorporating more $HfO_2$/ligand into the resist, a refractive index of approximately 1.8 with a UV absorbance below 0.15 $cm^{-1}$ may be obtained. The skilled artisan can readily appreciate that by using the linear extrapolation of the correlated data from FIG. 11 and FIG. 12 that a refractive index of approximately 1.9 with a UV absorbance below 0.15 $cm^{-1}$ may be attained.

A high-index nanocomposite photoresist with low UV absorption around 193 nm was prepared. In specific embodiments, the $HfO_2$-acetate nanoparticle with the size of 2 nm was synthesized and the acetate was substituted with PGMEA-miscible ligands using a ligand exchange reaction. In other embodiments, the $HfO_2$/triethyl 3-phosphonopropionate shows the best solubility and the lowest UV absorption in comparison to other ligands. In particular examples, the spin coated film of the $HfO_2$-ligand/resist mixture on the silicon wafer had good uniformity and had no defects like pinholes. Using a small amount of the $HfO_2$-ligand (0.7% by weight), the refractive index of the film increased from 1.7 to 1.73 and UV absorbance was changed from 0.045 to 0.06 $cm^{-1}$. The allowable upper limit for UV absorbance at 193 nm is 0.15 $cm^{-1}$. From the linear plot, it was extrapolated that a refractive index of approximately 1.9 and a UV absorbance below 0.15 $cm^{-1}$ can be attained by incorporating more of the $HfO_2$/ligand into the resist.

V. CHEMICAL MECHANICAL PLANARIZATION WITH METAL OXIDE NANOPARTICLES

Small and highly refractive index nanoparticles have chemical and physical properties that may be used to eliminate the defects associated with slurries used in chemical mechanical planarization or chemical mechanical polishing (CMP). Provided herein are metal oxide nanoparticles that are protected, functionalized or capped with carboxylic acid derivatives or phosphoric acid derivatives are small in diameter and do not aggregate. In some embodiments, these ligand functionalized metal oxide nanoparticles are incorporated into a slurry mixture and used for CMP.

The base systems for the protected or functionalized nanoparticles can be synthesized from the oxides of elements including lithium, beryllium, sodium, magnesium, aluminum, silicon, calcium, potassium, manganese, scandium, titanium, vanadium, chromium, zinc, iron, cobalt, nickel, copper, gallium, germanium, arsenic, selenium, zirconium, rubidium, strontium, yttrium, niobium, molybdenum, technetium, ruthenium, tin, cadmium, indium, cesium, antimony, tellurium, neodymium, barium, lanthanum, cerium, praseodymium, terbium, promethium, samarium, europium, gadolinium, ytterbium, dysprosium, holmium, erbium, thulium, rhenium, lutetium, hafnium, tantalum, tungsten, thallium, lead, and bismuth. These oxides may be binary, ternary or more complex compounds. Further, a pure material (for example, hafnium dioxide) or mixed materials (for example, titanium dioxide and aluminum oxide) can be used including any mixture of oxides from the elements listed above.

The skilled artisan will readily recognize that the reactions used to functionalize and cap the nanoparticles provide herein may need to be modified slightly for each metal oxide in order to provide optimum size, quality and yield.

In some embodiments, the capped metal oxide nanoparticles disclosed herein do not aggregate. The capping of the metal oxide nanoparticles may be carried out in various manners. For example, one method includes using acetic acid which caps the nanoparticle with either acetic acid or acetate. In another example, the method used to cap the nanoparticle uses a phosphate based cap. This method uses phosphoric acid and/or some derivative of phosphoric acid.

Figure 29:
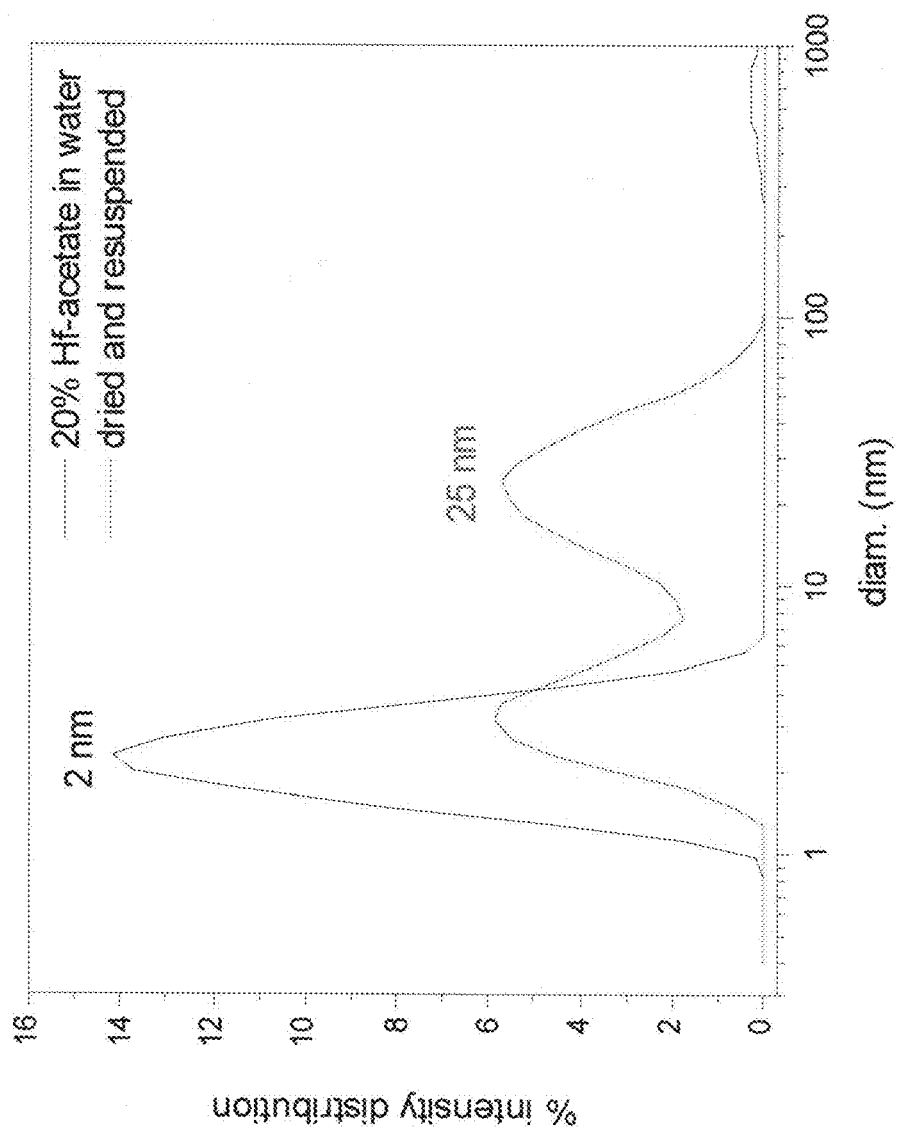
FIG. 29 shows size distribution of hafnium oxide acetate nanoparticles in aqueous suspensions before and after heat treatment.

One typical characteristic of a high quality CMP slurry is that the nanoparticles maintain their size and do not aggregate or grow significantly under adverse conditions, for example, when a nanoparticle containing solution is heated to elevated temperatures. The present disclosure provides for nanoparticles with sizes that range from 1 nm to 25 nm. Accurate size control can be achieved by drying an aqueous suspension of the nanoparticles at varying temperatures and then resuspending the dried powder in water. See FIG. 29.

VI. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

For example, a general metal oxide structure $MO_n$ has been discussed above; however, it will be anticipated that similar structures with modifications to the stoichiometry of the general formula are within the scope of the contents presented herein. For example, the more general metal oxide structure $M_xO_n$, where x is greater than one and n is greater than one, are considered within the realm of this disclosure. More than one metal ion may be present in the metal oxide, for example a metal oxide with the general structure $M_xM'_yO_n$, where x, y, and n are independently more than one. In general, the disclosed metal oxide nanoparticles may find utility in many applications, catalysis and chemical synthesis.

Methods and Materials

Hafnium oxychloride ($HfOCl_2 \cdot 8H_2O$), hafnium tetrachloride, hafnium tetrabromide and hafnium isopropoxide were purchased from Strem Chemicals. Nanopure water was used in all experiments. All the chemicals are purchased from Sigma-Aldrich except ligand #9 ((S)-(+)-tetrahydrofurfuryl-O,O'-diacetyl-(2R,3R)-hydrogentartrate). Ligand #9 was synthesized as described below. The 193 nm resist solution (TARF-P6111ME) was supplied by TOK. All other solvents and chemicals were reagent grade.

Dynamic light scattering was performed on a Malvern Zetasizer Nano-ZS. Infrared spectra were recorded on a Bruker Optics Vertex80 spectrometer. Refractive index was measured at 589 nm using a portable Mettler Toledo Refracto 30PX refractometer. Spectral index was measured at DuPont using the minimum deviation prism method (French et al., 2004). The refractive index at 193 nm was extrapolated from the spectral index measurements using the Cauchy model:

$$n(\lambda)=A+B/\lambda^2+C/\lambda^4$$

where the wavelength $\lambda$ is given in microns, A sets the index range, B and C give the dispersion shape. Viscosity measurements were performed on a strain-controlled Rheometrics Scientific ARES rheometer using a cone and plate measuring system with a diameter of 25 mm and cone angle of 0.1 radians. All viscosity measurements were performed at 25° C. in steady shear mode.

Fourier transform infrared (FTIR) measurements were performed on a Mattson Infinity Gold GTIR spectrometer. The samples were prepared in a KBr pellet. The particle size and distribution of the nanoparticles were determined using dynamic light scattering. The instrumentation was a Malvern Zetasizer nano-ZS. The incident light was 633 nm from He—Ne laser with 4 mW power. Correlation functions and data were acquired using software from Zetasizer instruments. Suspensions in Water (10 mg/ml) were analyzed. UV absorbance of the ligand solution was measured by Shimadzu UV-3101 UV/Vis/NIR spectrophotometer. The ligand concentration in water for UV absorbance was 20 μmol.

Ligand 9 ((s)-(+)-tetrahydrofurfuryl-O,O'-diacetyl-(2R,3R)-hydrogentartrate) was synthesized as follows. To a stirred mixture of racemic tetrahydrofurfuryl alcohol (4.7 g) and pyridine (0.4 g) solid diacetyltartaric anhydride (10 g) was added. Stirring was continued for 30 minutes at room temperature, then 5 ml of ethyl acetate was added, and the temperature was raised to 80° C. After 2 hr heating 10 ml of ethyl acetate was added, and the mixture was allowed to cool to room temperature, then kept for 10 hrs at 5° C. The crystals were filtered off, washed with ethyl acetate (10 ml) and dried. Seven grams of crude ester were obtained. The crude product was re-crystallized three times from ethyl acetate to yield 1.8 g of pure Ligand 9. IR (KBr, cm$^{-1}$): 1069, 1212, 1750, 1759, 2605, 2944, 3495.

Example 1

$HfO_2$ Acetate Capped Nanoparticles

Hafnium isopropoxide (6.0 g, 12.6 mmoles) was dissolved in 30.0 mL acetic acid and stirred at 65° C. for 15 min to form a clear solution. Then 10.0 mL of a solution comprised of 9.0 mL acetic acid and 1.0 mL $H_2O$ (1.0 g, 55.5 mmoles) was added causing the formation of a white precipitate. The reaction mixture was stirred at 65° C. for 18 h before 10 mL of a similar acetic acid—water solution was added followed by stirring for 3 hours at the same temperature. The white precipitate was centrifuged at 8,000 g for 10 minutes and then washed once with acetic acid and twice with acetone.

The final product, in the form of a white powder, was obtained after drying at 60° C. under vacuum. Immersion fluids were prepared by adding proper amounts of this powder in water followed by stirring and ultrasonication. Any aggregates or dust were removed by filtration using a 0.2 μm filter membrane. Elemental analysis results are as follows:

| Experimental | Hf | C | H | O |
|---|---|---|---|---|
| Hf-acetate (acetone) | 44.28 | 17.06 | 2.33 | 36.33 |
| Hf-acetate (water) | 55.14 | 9.67 | 2.53 | 32.57 |

Formulas consistent with these results are shown here:

| Proposed formula | Hf | C | H | O |
|---|---|---|---|---|
| $Hf_4O_5(OH)(CH_3COO)_5(CH_3COOH)_6$ | 48.7 | 18.0 | 2.7 | 30.6 |
| $Hf_4O_5(OH)(CH_3COO)_5(H_2O)_8$ | 57.1 | 9.6 | 2.6 | 30.7 |

Example 2

$HfO_2$ Halide Capped Nanoparticles

Hafnium tetrachloride was placed in the bottom of a three-neck flask with all tops capped. The middle cap was removed and the appropriate alcohol was added. The round bottom was placed in a hot oil bath. The mixture was heated to the specified temperature and time. Details on stoichiometry, reactions conditions and resulting particle size are provided in Table 1.

TABLE 1

Reaction of $HfCl_4$ and $HfBr_4$ in Various Alcohols.

| Hafnium Precursor (mass) | Alcohol (volume) | Temperature (° C.) | Time | Particle Size (nm) |
|---|---|---|---|---|
| $HfCl_4$ (1.0 g) | Benzyl Alcohol (80 mL) | 70-75 | ~24 h | 25+ |
| $HfCl_4$ (1.0 g) | Butanol (80 mL) | 80 | ~24 h | — |
| $HfCl_4$ (1.0 g) | Octanol (80 mL) | 80 | ~24 h | 295 |
| $HfCl_4$ (1.0 g) | Cyclohexanol (80 mL) | 80 | ~24 h | 44 |
| $HfCl_4$ (1.05 g) | Iso-butanol (80 mL) | 80+ | ~24 h | Too large |
| $HfCl_4$ (0.257 g) | 2-butanol (20 mL) | 80+ | ~24 h | 680 |
| $HfBr_4$ (0.25 g) | 2-butanol (20 mL) | 80+ | ~24 h | 68,297 |
| $HfBr_4$ (0.26 g) | iso-butanol (20 mL) | 80 | ~24 h | 52,428 |
| $HfBr_4$ (0.26 g) | t-butanol (20 mL) | 80 | ~24 h | Too large |
| $HfCl_4$ (0.125 g) | Octanol (10 mL) | 80 | ~24 h | 1528 |
| $HfCl_4$ (0.128 g) | iso-butanol (10 mL) | 80 | ~24 h | 474 |
| $HfCl_4$ (0.126 g) | 2-butanol (10 mL) | 80 | ~24 h | 1566 |
| $HfBr_4$ (0.126 g) | iso-butanol (10 mL) | 80 | ~24 h | 439 |

Example 3

$HfO_2$ Chloride Capped Nanoparticles

Hafnium tetrachloride was placed in the bottom of three neck flask with all tops capped. The middle cap was removed and a 50 ml addition funnel was added. Through the funnel tert-alcohol was added followed by water. The mixture was then heated. Details on stoichiometry, reactions conditions and resulting particle size are provided in Table 2.

TABLE 2

Reaction of $HfCl_4$ in Tert-Butanol/Water.

| Hafnium Precursor (mass) | tert-butanol/Water (volume) | Temperature (° C.) | Time | Particle Size (nm) |
|---|---|---|---|---|
| $HfCl_4$ (0.5045 g) | 20 mL/20 mL | 80 | ~29 h | 2.8 |
| $HfCl_4$ (0.5025 g) | 20 mL/20 mL | 80 | ~26 h | 4.0 |

Example 4

Carboxylate Capped Nanoparticles

Hafnium tetrachloride was placed in steel Parr reactor with a stir bar. A solution containing tert-butanol, water and the appropriate acid was poured into the reactor. The reactor vessel was closed tight and placed in an oil bath at 200° C. for 2 hours. At the end of the reaction the reactor was removed from the oil bath and the contents of the reactor were filtered using a syringe attached to a 0.2 μm filter. Details on stoichiometry, reactions conditions and resulting particle size are provided in the Appendix, Table 3.

TABLE 3

Reaction of $HfCl_4$ in Tert-Butanol/Water in the Presence of Different Organic Acids.

| Organic acid | | Acid/Hf (molar ratio) | Particle Size (nm) |
|---|---|---|---|
| 3-carbon | Propanoic acid | 0.5 | 42 |
| | | 1 | 0.72 |
| | | 2 | 17.9 |
| 6-carbon | Hexanoic acid | 0.4 | 32 |
| | | 1 | 1.0 |
| | | 2 | 0.7 |
| 9-carbon | Nonanoic acid | 0.33 | 1.2 |
| | | 1 | 1.0 |
| | | 2 | 0.7 |
| 14-carbon | Myristic acid | 0.2 | 0.73 |
| Amino acids | Histidine | 0.8 | 0.82 |
| | Phenylalanine | 0.8 | 0.98 |

Example 5

Chloride Capped Nanoparticles $HfOCl_2.8H_2O$ (1.0 g) was heated at 80° C. until it reached 80% of its initial weight (0.8 g). Then the appropriate amount of water was added in order to achieve the desired Hf wt %. For example, to achieve a 50 wt % solution, 0.8 g of water are added to 0.8 g of the heat-treated $HfOCl_2.8H_2O$. Any aggregates or dust were removed by filtration using a 0.2 μm filter membrane.

Example 6

Triethyl 3-Phosphonopropionate Capped Nanoparticle $HfO_2$-acetate (20 mg) and triethyl 3-phosphonopropionate (Ligand 2) (1 mg) were dissolved in 3 ml of a 193 nm resist solution. After sonicating for 5 minutes, the solution was heated at 130° C. for 5 minutes, after which the solution became transparent. After being filtered through a 0.2 μm filter, the solution was then spin-coated onto a 4 inch by 8 inch bare silicon wafer. The film (approximately 100 nm) was baked at 130° C. for 90 seconds as a post applied bake (PAB).

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, and those listed in the Appendix, to the extent that they provide exemplary procedural or other details supplementary to those set forth herein, are specifically incorporated herein by reference.

Blanc, P., Larbot, A. and Cot, L., "Hafnia colloidal solution from hydrothermal synthesis and membrane preparation", *J. European Ceram. Soc.* 17, 397-401 (1997).

Chumanov, G., Evanoff, D., D., Luzinov, I., Klep, V., Zdryko, B., Conley, W. and Zimmerman, P., "Nanocomposite liquids for 193 nm immersion lithography: a progress report", *Proc SPIE* 5753, 847-850 (2005).

Clearfield, A., "The mechanism of hydrolytic polymerization of zirconyl solutions", *J. Mater. Res.* 5(1), 161-162 (1990).

French, R. H., Qiu, W., Yang, M. K., Wheland, R. S., Lemon, M. F., Shoe, E. L., Adelman, D. J., Crawford, M. K., Tran, H. V., Feldman, J., McLain, S. J.; and Peng, S., "Second generation fluids for 193 nm immersion lithography" *Proc. SPIE* 6154, 615415 (2006).

French, R., H., Yang, M., K., Lemon, M., F., Synowicki, R., A., Pribil, G., K., Cooney, G., T., Herzinger, C., M., Green, S., E., Burnett, J., H. and Kaplan, S., G., "Immersion fluid refractive indices using prism minimum deviation techniques", *Proc. SPIE* 5377, 1689-1694 (2004).

Kirk, J. Kroschwitz, D. Othmer, K. Othmer and A. Seidel *Kirk-Othmer Encyclopedia of Chemical Technology*, 5th Edition (2005). Patnaik, P. *Handbook of Inorganic Chemicals*, by Pradyot Patnaik (2002).

Rice, B. J., "High-index materials research key to extending immersion lithography", *Solid State Technol.* 51(2), 28-33 (2008).

Sewell, H., Mulkens, J., McCafferty, D., Markoya, L., Streefkerk, B. and Graeupner, P., "The next phase for immersion lithography", *Proc. SPIE* 6154, 615406 (2006).

Switkes, M. et al., *J. Vac. Sci. & Tech. B.* 21; 2794-2799 (2003).

Wang, Y., Miyamatsu, T., Furukawa, T., Yamada, K., Tominaga, T., Makita, Y., Nakagawa, H., Nakamura, A., Shima, M., Kusumoto, S., Shimokawa, T. and Hieda, K., "High-refractive-index fluids for the next-generation ArF immersion lithography", *Proc. SPIE* 6153, 61530A (2006).

Zimmerman, P., A., Rice, B., Rodriguez, R., Zettel, M., F., Trikeriotis, M., Wang, D., Yi, Y., Bae, W., J., Ober, C., K. and Giannelis, E., P., "The use of nanocomposite materials for high refractive index immersion lithography", *J. Photopolym. Sci. Technol.* 21(5), 621-629 (2008).

What is claimed is:

1. A nanoparticle comprising:
   a) a core comprising a Group 4 metal oxide; and
   b) a coating surrounding the core, where the coating comprises a ligand, wherein the ligand is a carboxylate$_{(C1-16)}$, an acid thereof or a substituted version of either; an amino acid or salt thereof; or a dialkylphosphonate$_{(C1-16)}$.

2. The nanoparticle of claim 1, wherein the Group 4 metal oxide is $HfO_2$.

3. The nanoparticle of claim 1, wherein the Group 4 metal oxide is $ZrO_2$.

4. The nanoparticle of claim 1, wherein the Group 4 metal oxide is $TiO_2$.

5. The nanoparticle of claim 1, wherein the elemental weight percentage of the nanoparticle is approximately from about 55% to about 76% hafnium oxide.

6. The nanoparticle of claim 1, wherein the elemental weight percentage of the nanoparticle is approximately from about 41% to about 67% zirconium oxide.

7. The nanoparticle of claim 1, wherein the elemental weight percentage of the nanoparticle is approximately from about 31% to about 59% titanium oxide.

8. The nanoparticle of claim 1, wherein the nanoparticle has a diameter from about 0.7 nm to about 5 nm.

9. The nanoparticle of claim 8, wherein the nanoparticle has a diameter from about 1 nm to about 4 nm.

10. The nanoparticle of claim 8, wherein the nanoparticle has a diameter from about 1 nm to about 2 nm.

11. The nanoparticle of claim 8, wherein the nanoparticle has a diameter of about 1 nm.

12. The nanoparticle of claim 1, wherein the ligand is a carboxylate$_{(C1-16)}$, an acid thereof or a substituted version of either.

13. The nanoparticle of claim 12, wherein the ligand is acetate or acetic acid.

14. The nanoparticle of claim 12, wherein the ligand is propanoic acid, hexanoic acid, nonanoic acid, myristic acid, or a salt of any of these acids.

15. The nanoparticle of claim 12, wherein the ligand is methacrylate or methacrylic acid.

16. The nanoparticle of claim 12, wherein the ligand is tartarate or an ester or acid thereof.

17. The nanoparticle of claim 16, wherein the ligand is O, O'-di-pivaloyl-L-tartarate or an ester or acid thereof.

18. The nanoparticle of claim 12, wherein the ligand is mono-tert-butyl malonate or mono-tert-butyl succinate.

19. The nanoparticle of claim 1, wherein the ligand is tert-Butyl formate.

20. The nanoparticle of claim 1, wherein the ligand is an amino acid or salt thereof.

21. The nanoparticle of claim 20, wherein the ligand is histidine or phenyl alanine.

22. The nanoparticle of claim 1, wherein the ligand is a dialkylphosphonate$_{(C1-16)}$.

23. The nanoparticle of claim 22, wherein the ligand is selected from the group consisting of:

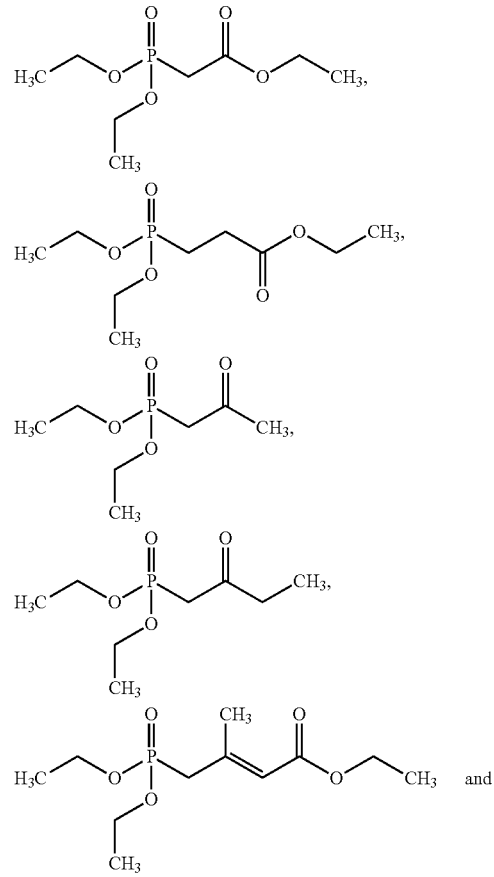

-continued
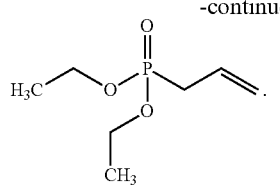
24. The nanoparticle or claim 1, wherein the ligand is phosphate or an acid or ester thereof.
25. The nanoparticle of claim 1, further comprising a second ligand.
26. The nanoparticle of claim 1, wherein the Group 4 metal oxide is $HfO_2$ and the ligand is acetate.
* * * * *

UNITED STATES PATENT AND TRADEMARK OFFICE
CERTIFICATE OF CORRECTION

PATENT NO. : 8,124,230 B2  
APPLICATION NO. : 12/583078  
DATED : February 28, 2012  
INVENTOR(S) : Paul A. Zimmerman et al.

Page 1 of 1

It is certified that error appears in the above-identified patent and that said Letters Patent is hereby corrected as shown below:

In claim 24, column 24, line 1, delete "or" and insert --of-- therefor.

Signed and Sealed this  
First Day of May, 2012

David J. Kappos  
*Director of the United States Patent and Trademark Office*